(12) United States Patent
Callard et al.

(10) Patent No.: US 8,229,441 B2
(45) Date of Patent: Jul. 24, 2012

(54) GRADUATED SINGLE FREQUENCY NETWORK

(75) Inventors: Aaron Callard, Ottawa (CA); Jianglei Ma, Kanata (CA); Sophie Vrzic, Nepean (CA)

(73) Assignee: Avaya Inc., Basking Ridge, NJ (US)

( * ) Notice: Subject to any disclaimer, the term of this patent is extended or adjusted under 35 U.S.C. 154(b) by 706 days.

(21) Appl. No.: 12/197,942

(22) Filed: Aug. 25, 2008

(65) Prior Publication Data

US 2009/0291700 A1  Nov. 26, 2009

Related U.S. Application Data

(60) Provisional application No. 60/957,916, filed on Aug. 24, 2007, provisional application No. 61/038,506, filed on Mar. 21, 2008.

(51) Int. Cl.
*H04W 40/00* (2009.01)

(52) U.S. Cl. ........ 455/446; 455/447; 455/448; 455/449; 455/450; 455/454

(58) Field of Classification Search ........... 455/446–454
See application file for complete search history.

(56) References Cited

U.S. PATENT DOCUMENTS

| 2007/0047483 | A1 | 3/2007 | Khan |
| 2008/0025240 | A1 | 1/2008 | Casaccia et al. |
| 2010/0056166 | A1* | 3/2010 | Tenny ............ 455/450 |
| 2010/0322350 | A1* | 12/2010 | Malladi ........ 375/299 |

FOREIGN PATENT DOCUMENTS

CA   2667489   5/2008

OTHER PUBLICATIONS

International Search Report for PCT/IB2009/006484, mailed Jun. 3, 2010.

* cited by examiner

*Primary Examiner* — Fayyaz Alam
(74) *Attorney, Agent, or Firm* — Withrow & Terranova, PLLC

(57) ABSTRACT

The signals from adjacent transmitters reinforce one another. As a result of this over-the-air combining, signal quality is improved in the network and especially at or near cell boundaries. The present invention provides a graduated single frequency network (GSFN) wherein transmitters in cells throughout a geographic area cooperate to broadcast data to user terminals throughout the geographic area, and adjacent transmitters transmit signals that substantially reinforce one another. When transmitting the data, transmitters in certain adjacent cells throughout the geographic area may employ slightly different transmit parameters to provide slightly different transmission signals. The transmission signals used to transmit the data may be varied in a graduated fashion throughout the geographic area, wherein even when there is a difference in the transmission signals of transmitters in adjacent cells, the transmission signals reinforce one another despite being different.

25 Claims, 21 Drawing Sheets

|  | RB1 | RB2 | RB3 | RB4 | RB5 | RB6 | RB7 | RB8 | RB9 | RB10 | RB11 | RB12 | EFFECTIVE ENCODING RATE FOR $D_X$ |
|---|---|---|---|---|---|---|---|---|---|---|---|---|---|
| CELLS H | $D_1$ | $D_2$ | $D_3$ | $D_4$ | $P_1$ | $P_2$ | $P_3$ | $P_4$ | $P_5$ | $P_6$ | $P_7$ | $P_8$ | 1/3 |
| CELLS G | $D_1$ | $D_2$ | $D_3$ | $D_4$ | $P_1$ | $P_2$ | $P_3$ | $P_4$ | $P_5$ | $P_6$ | $P_7$ | | 4/11 |
| CELLS F | $D_1$ | $D_2$ | $D_3$ | $D_4$ | $P_1$ | $P_2$ | $P_3$ | $P_4$ | $P_5$ | $P_6$ | | | 4/10 |
| CELLS E | $D_1$ | $D_2$ | $D_3$ | $D_4$ | $P_1$ | $P_2$ | $P_3$ | $P_4$ | $P_5$ | | | | 4/9 |
| CELLS D | $D_1$ | $D_2$ | $D_3$ | $D_4$ | $P_1$ | $P_2$ | $P_3$ | $P_4$ | | | | | 1/2 |
| CELLS C | $D_1$ | $D_2$ | $D_3$ | $D_4$ | $P_1$ | $P_2$ | $P_3$ | | | | | | 4/7 |
| CELLS B | $D_1$ | $D_2$ | $D_3$ | $D_4$ | $P_1$ | $P_2$ | | | | | | | 2/3 |
| CELLS A | $D_1$ | $D_2$ | $D_3$ | $D_4$ | $P_1$ | | | | | | | | 4/5 |

$D_X$ = SUBGROUP X OF DATA D
$P_Y$ = PARITY INFO FOR DATA AT ENCODING LEVEL Y

FIG. 3

| | RB1 | RB2 | RB3 | RB4 | RB5 | RB6 | RB7 | RB8 | RB9 | RB10 | RB11 | RB12 | EFFECTIVE ENCODING RATE FOR D |
|---|---|---|---|---|---|---|---|---|---|---|---|---|---|
| CELLS H | $D_1/P_1$ | $D_2/P_1$ | $D_3/P_1$ | $D_4/P_1$ | $D_5/P_1$ | $P_2$ | $P_3$ | $P_4$ | $P_5$ | $P_6$ | $P_7$ | $P_8$ | 1/3 |
| CELLS G | $D_1/P_1$ | $D_2/P_1$ | $D_3/P_1$ | $D_4/P_1$ | $D_5/P_1$ | $P_2$ | $P_3$ | $P_4$ | $P_5$ | $P_6$ | $P_7$ | | 4/11 |
| CELLS F | $D_1/P_1$ | $D_2/P_1$ | $D_3/P_1$ | $D_4/P_1$ | $D_5/P_1$ | $P_2$ | $P_3$ | $P_4$ | $P_5$ | $P_6$ | | | 4/10 |
| CELLS E | $D_1/P_1$ | $D_2/P_1$ | $D_3/P_1$ | $D_4/P_1$ | $D_5/P_1$ | $P_2$ | $P_3$ | $P_4$ | $P_5$ | | | | 4/9 |
| CELLS D | $D_1/P_1$ | $D_2/P_1$ | $D_3/P_1$ | $D_4/P_1$ | $D_5/P_1$ | $P_2$ | $P_3$ | $P_4$ | | | | | 1/2 |
| CELLS C | $D_1/P_1$ | $D_2/P_1$ | $D_3/P_1$ | $D_4/P_1$ | $D_5/P_1$ | $P_2$ | $P_3$ | | | | | | 4/7 |
| CELLS B | $D_1/P_1$ | $D_2/P_1$ | $D_3/P_1$ | $D_4/P_1$ | $D_5/P_1$ | $P_2$ | | | | | | | 2/3 |
| CELLS A | $D_1/P_1$ | $D_2/P_1$ | $D_3/P_1$ | $D_4/P_1$ | $D_5/P_1$ | | | | | | | | 4/5 |

$D_X$ = SUBGROUP X OF DATA D
$P_Y$ = PARITY INFO FOR DATA AT ENCODING LEVEL Y

| | RB1 | RB2 | RB3 | RB4 | RB5 | RB6 | RB7 | RB8 | RB9 | RB10 | RB11 | RB12 | EFFECTIVE ENCODING RATE FOR D |
|---|---|---|---|---|---|---|---|---|---|---|---|---|---|
| CELLS H | $D_1$ | $D_2$ | $D_3$ | $D_4$ | $P_1$ | $P_2$ | $P_3$ | $P_4$ | $P_5$ | $P_6$ | $P_7$ | $P_8$ | 1/3 |
| CELLS G | $D_1$ | $D_2$ | $D_3$ | $D_4$ | $P_1$ | $P_2$ | $P_3$ | $P_4$ | $P_5$ | $P_6$ | $P_7$ | B | 4/11 |
| CELLS F | $D_1$ | $D_2$ | $D_3$ | $D_4$ | $P_1$ | $P_2$ | $P_3$ | $P_4$ | $P_5$ | $P_6$ | B | OTHER DATA | 4/10 |
| CELLS E | $D_1$ | $D_2$ | $D_3$ | $D_4$ | $P_1$ | $P_2$ | $P_3$ | $P_4$ | $P_5$ | B | OTHER DATA | | 4/9 |
| CELLS D | $D_1$ | $D_2$ | $D_3$ | $D_4$ | $P_1$ | $P_2$ | $P_3$ | $P_4$ | B | OTHER DATA | | | 1/2 |
| CELLS C | $D_1$ | $D_2$ | $D_3$ | $D_4$ | $P_1$ | $P_2$ | $P_3$ | B | OTHER DATA | | | | 4/7 |
| CELLS B | $D_1$ | $D_2$ | $D_3$ | $D_4$ | $P_1$ | $P_2$ | B | OTHER DATA | | | | | 2/3 |
| CELLS A | $D_1$ | $D_2$ | $D_3$ | $D_4$ | $P_1$ | B | OTHER DATA | | | | | | 4/5 |

$D_X$ = SUBGROUP X OF DATA D
$P_Y$ = PARITY INFO FOR DATA AT ENCODING LEVEL Y
B = BLANK

| | RB1 | RB2 | RB3 | RB4 | RB5 | RB6 | RB7 | RB8 | RB9 | RB10 | RB11 | RB12 | EFFECTIVE ENCODING RATE FOR D |
|---|---|---|---|---|---|---|---|---|---|---|---|---|---|
| CELLS H | $D_1$ | $D_2$ | $D_3$ | $D_4$ | $P_1$ | $P_2$ | $P_3$ | $P_4$ | B | OTHER DATA | | | 1/2 |
| CELLS G | $D_1$ | $D_2$ | $D_3$ | $D_4$ | $P_1$ | $P_2$ | $P_3$ | $P_4$ | $P_5$ | OTHER DATA | | | 4/9 |
| CELLS F | $D_1$ | $D_2$ | $D_3$ | $D_4$ | $P_1$ | $P_2$ | $P_3$ | $P_4$ | $P_5$ | $P_6$ | B | OTHER DATA | 4/10 |
| CELLS E | $D_1$ | $D_2$ | $D_3$ | $D_4$ | $P_1$ | $P_2$ | $P_3$ | $P_4$ | $P_5$ | OTHER DATA | | | 4/9 |
| CELLS D | $D_1$ | $D_2$ | $D_3$ | $D_4$ | $P_1$ | $P_2$ | $P_3$ | B | OTHER DATA | | | | 1/2 |
| CELLS C | $D_1$ | $D_2$ | $D_3$ | $D_4$ | $P_1$ | $P_2$ | B | OTHER DATA | | | | | 4/7 |
| CELLS B | $D_1$ | $D_2$ | $D_3$ | $D_4$ | $P_1$ | B | OTHER DATA | | | | | | 2/3 |
| CELLS A | $D_1$ | $D_2$ | $D_3$ | $D_4$ | $P_1$ | OTHER DATA | | | | | | | 4/5 |

$D_X$ = SUBGROUP X OF DATA D
$P_Y$ = PARITY INFO FOR DATA AT ENCODING LEVEL Y
B = BLANK

FIG. 6

ADAPTATION OF MODULATION: EXAMPLE

| CELL | A | B | C | D | E | F | G | H |
|------|------|------|------|------|------|------|------|---|
| $K_1$ | 1.85 | 1.88 | 1.91 | 1.94 | 1.96 | 1.96 | 1.97 | 2 |
| $K_2$ | 0.8 | 0.7 | 0.6 | 0.5 | 0.5 | 0.4 | 0.3 | 0 |

FIG. 11

GRADUATED SINGLE FREQUENCY NETWORK

This application claims the benefit of U.S. provisional application 60/957,916 filed Aug. 24, 2007 and U.S. provisional application 61/038,506 filed Mar. 21, 2008, the disclosures of which are incorporated herein by reference in their entireties.

FIELD OF THE INVENTION

The present invention relates to communications, and in particular to a graduated single frequency network.

BACKGROUND OF THE INVENTION

Single frequency network (SFNs) are often employed to broadcast information to users throughout a cellular or like network. When employing SFN techniques in a cellular network, adjacent base stations will transmit the same information at the same time using the same radio resources. By having multiple base stations transmit the same information at the same time using the same resources, the signals transmitted from the different base stations effectively reinforce each other and therefore increase the spectral efficiency of the overall network with respect to the signals being transmitted. Increases in spectral efficiency are greatest along cell boundaries where multiple relatively weak signals combine with each other to increase the effective power associated with the transmitted signals. As such, the transmitted signals are readily received along the cell boundaries because the effective power of the transmitted signals is increased and the potential for interference is decreased.

However, the benefits of SFNs are not without compromises. Throughout an SFN, different channel qualities may occur due to base station locations, cell sizes, interference levels, physical topologies, neighboring transmissions, and the like. If each base station in the SFN of a cellular network has to transmit the same information at the same time using the same resources, the entire SFN must be designed to accommodate those cells or areas having the worst channel quality. Since the areas with the worst channel quality dictate the resources for the entire SFN, those areas with relatively high channel quality are theoretically using more resources than are necessary for broadcasting the data of the SFN. These resources could be better used for supporting traditional voice, data, or other media applications. As such, the efficiency of SFNs is significantly constrained, especially in SFNs where there is significant variation in channel quality from one area of the cellular network to another.

Accordingly, there is a need to improve the efficiency of SFN networks, while retaining the improved spectral efficiency that is normally associated with SFNs.

SUMMARY OF THE INVENTION

The signals from adjacent transmitters reinforce one another. As a result of this over-the-air combining, signal quality is improved in the network and especially at or near cell boundaries. The present invention provides a graduated single frequency network (GSFN) wherein transmitters in cells throughout a geographic area cooperate to broadcast data to user terminals throughout the geographic area, and adjacent transmitters transmit signals that reinforce one another. When transmitting the data, transmitters in certain adjacent cells throughout the geographic area may employ different transmit parameters to provide different transmission signals. The transmission signals used to transmit the data may be varied in a graduated fashion throughout the geographic area, wherein when there is a difference in the transmission signals of transmitters in adjacent cells, the difference is configured to allow the transmission signals to reinforce one another despite being different.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 illustrates a resource allocation according to a first embodiment of the present invention.

FIG. 4 illustrates a resource allocation according to a second embodiment of the present invention.

FIG. 5 illustrates a resource allocation according to a third embodiment of the present invention.

FIG. 6 illustrates a resource allocation according to a fourth embodiment of the present invention.

FIG. 11 provides a table of exemplary scaling factors according to one embodiment of the present invention.

Figure 12:
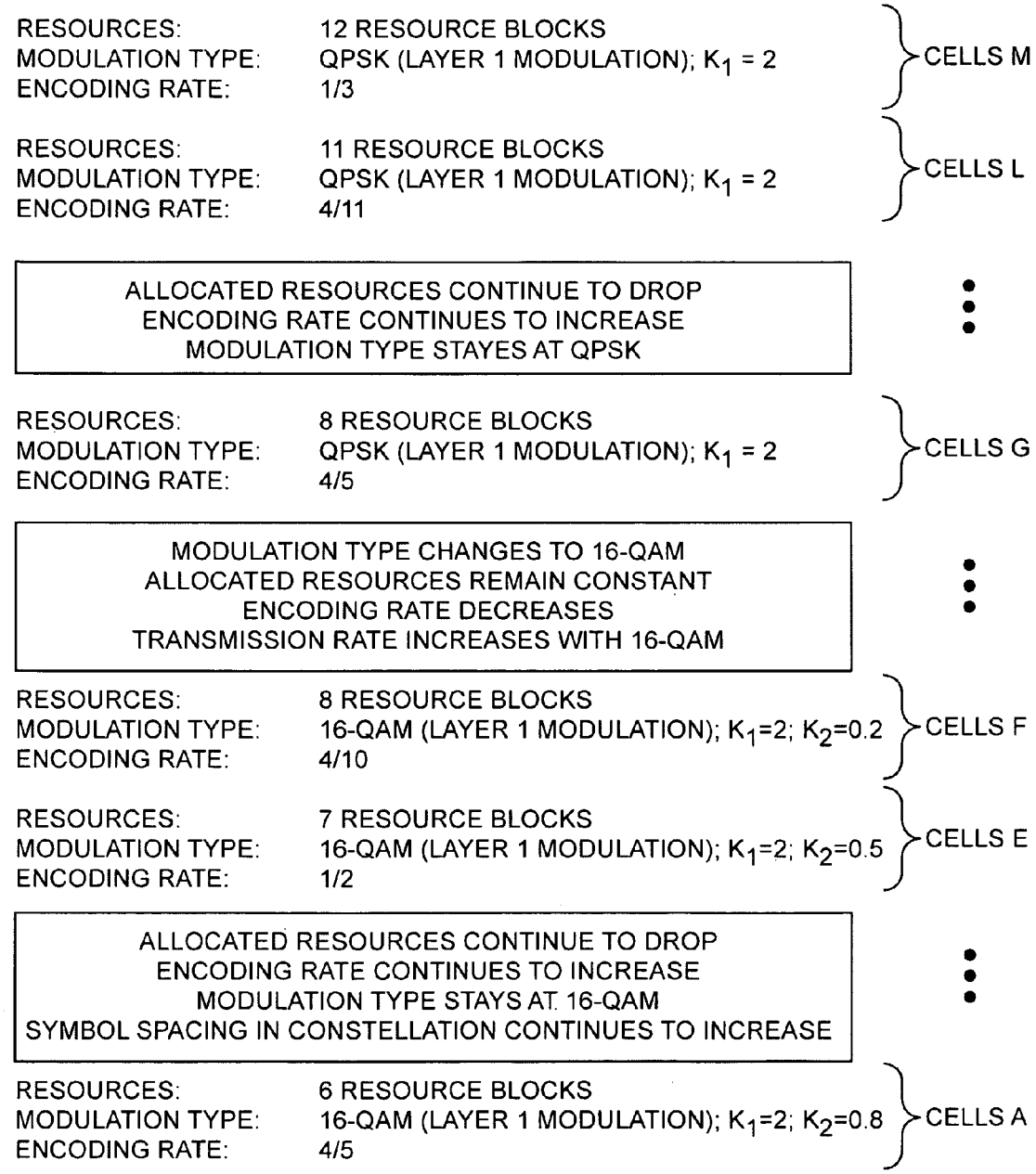

FIG. 12 is a flow diagram illustrating the combination of multiple embodiments of the present invention.

Figure 13:
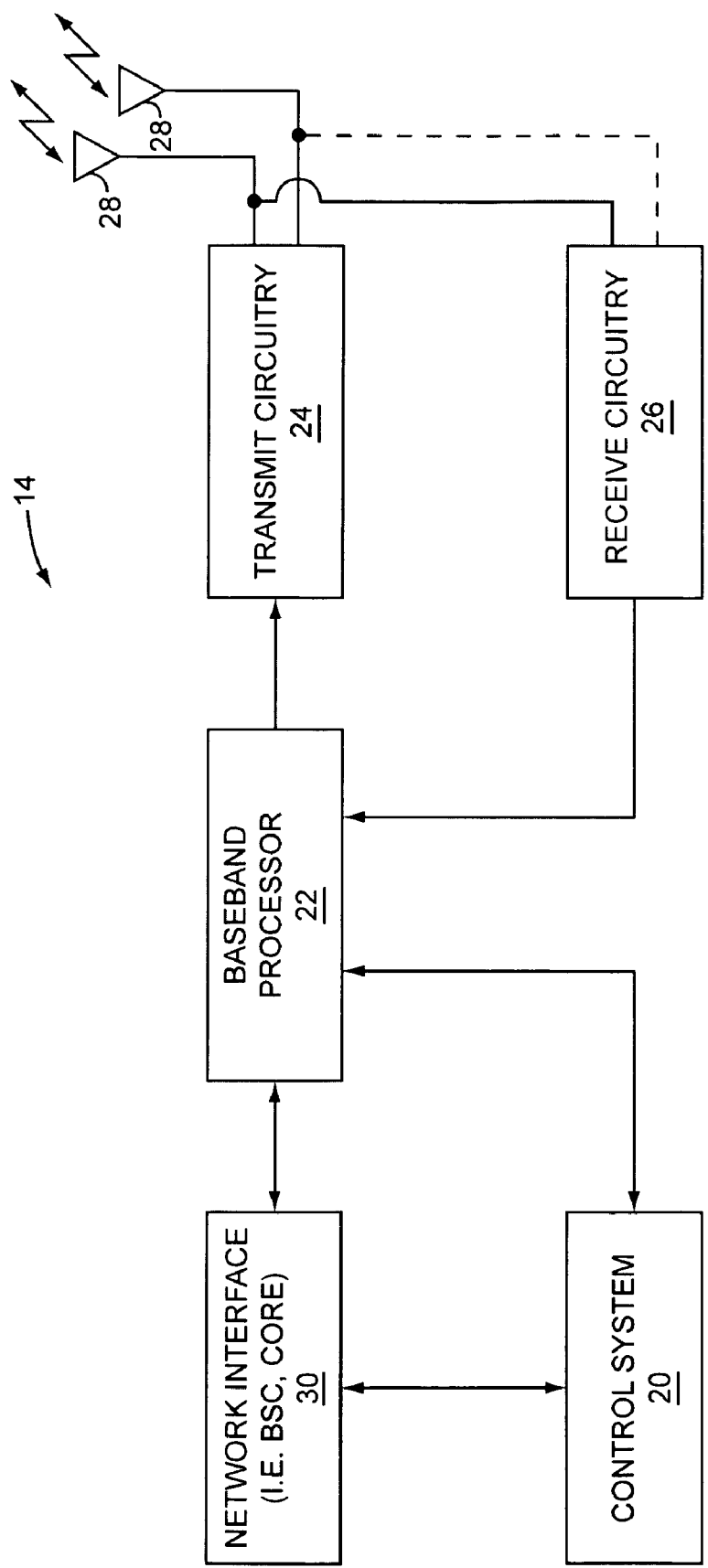

FIG. 13 is a block representation of a base station according to one embodiment of the present invention.

Figure 14:
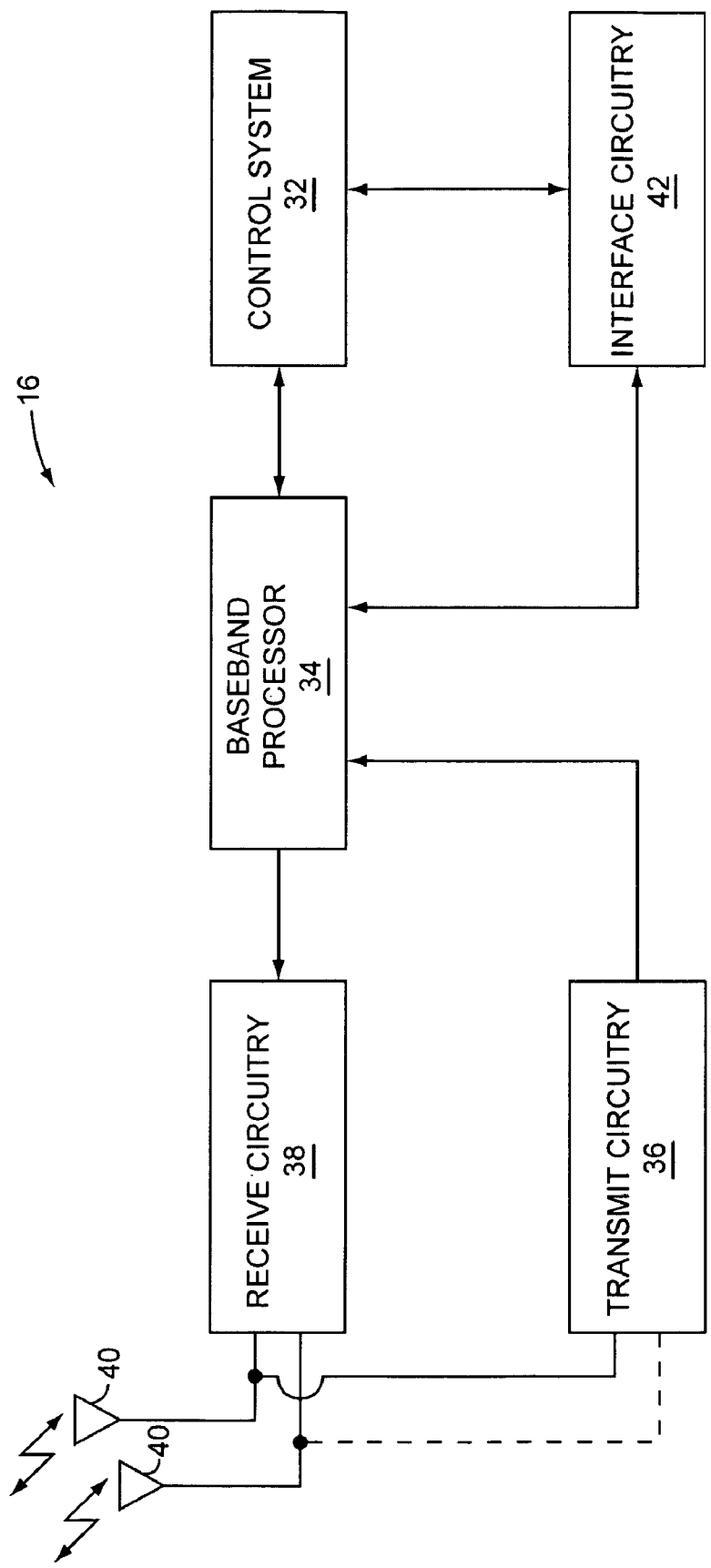

FIG. 14 is a block representation of a user terminal according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

A single frequency network (SFN) is effectively a network wherein transmitters in cells throughout a geographic area broadcast data using the same transmission signal at the same time. The signals from adjacent transmitters reinforce one another. As a result of this over-the-air combining, signal quality is improved in the network and especially at or near cell boundaries. The present invention provides a graduated single frequency network (GSFN) wherein transmitters in cells throughout a geographic area cooperate to broadcast data to user terminals throughout the geographic area, and adjacent transmitters transmit signals that reinforce one another. When transmitting the data, transmitters in certain adjacent cells throughout the geographic area may employ different transmit parameters to provide different transmission signals. The transmission signals used to transmit the data may be varied in a graduated fashion throughout the geographic area, wherein when there is a difference in the transmission signals of transmitters in adjacent cells, the difference is configured to allow the transmission signals to reinforce one another despite being different. While transmitters in certain adjacent cells may use different transmission signals to transmit the data, other adjacent cells may use the same transmission signal at any given time. Changes in transmission signals may be controlled based on the channel conditions in the cells throughout the geographic area. As such, the transmission signals may continue to vary in a graduated fashion throughout the geographic area based on various criteria, such as the channel conditions in the corresponding cells. In one embodiment, any differences between the transmission signals from transmitters in any two adjacent cells are proportional to the change in channel quality between the two adjacent cells. Larger changes in channel quality between adjacent cells will result in larger differences between the respective transmission signals, whereas smaller changes in channel quality between adjacent cells will result in smaller different between the respective transmission signals.

Figure 1:
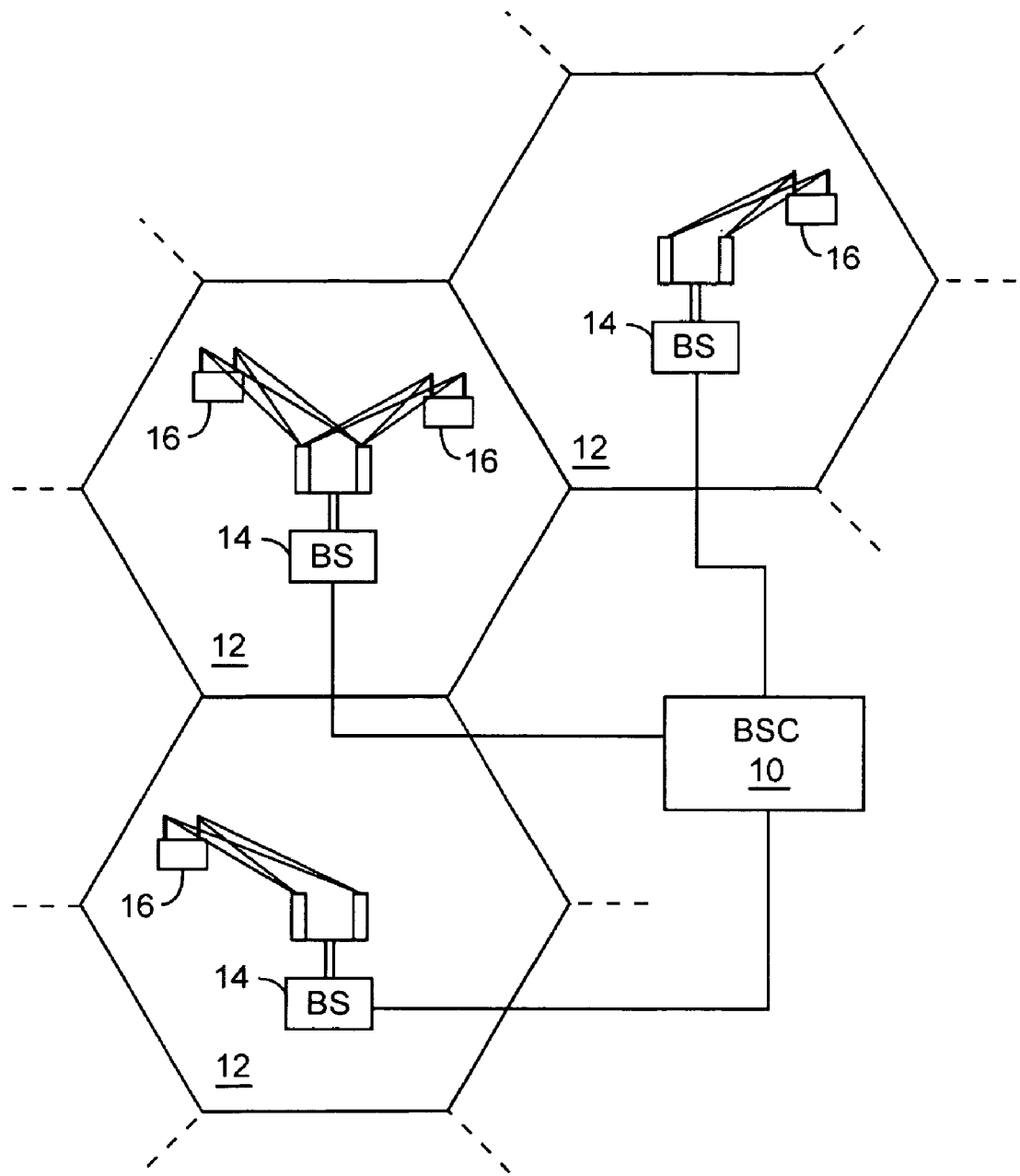
FIG. 1 is a block representation of a communication environment according to one embodiment of the present invention.

Prior to delving into the details of the present invention, an overview of an exemplary communication environment in which the present invention may be employed is described. With particular reference to FIG. 1, a portion of a cellular network is depicted wherein a base station controller (BSC) 10 serves a plurality of cells 12. Each cell 12 represents the primary coverage area of a particular base station (BS) 14 that is operating under the control of the BSC 10. The base stations 14 are capable of facilitating bi-directional communications through any number of communication technologies with user terminals (UT) 16 that are within communication range of the base stations 14, and thus within a corresponding cell 12. Communications throughout the cellular network may support traditional voice and data communications, wherein separate sessions are established with separate user terminals 16 as well as broadcast communications, wherein effectively the same information is broadcast by multiple base stations 14 at the same time. Accordingly, the cellular network may support traditional voice calls as well as provide a mechanism for broadcasting radio or television content throughout all or portions of the cellular network.

Figure 2:
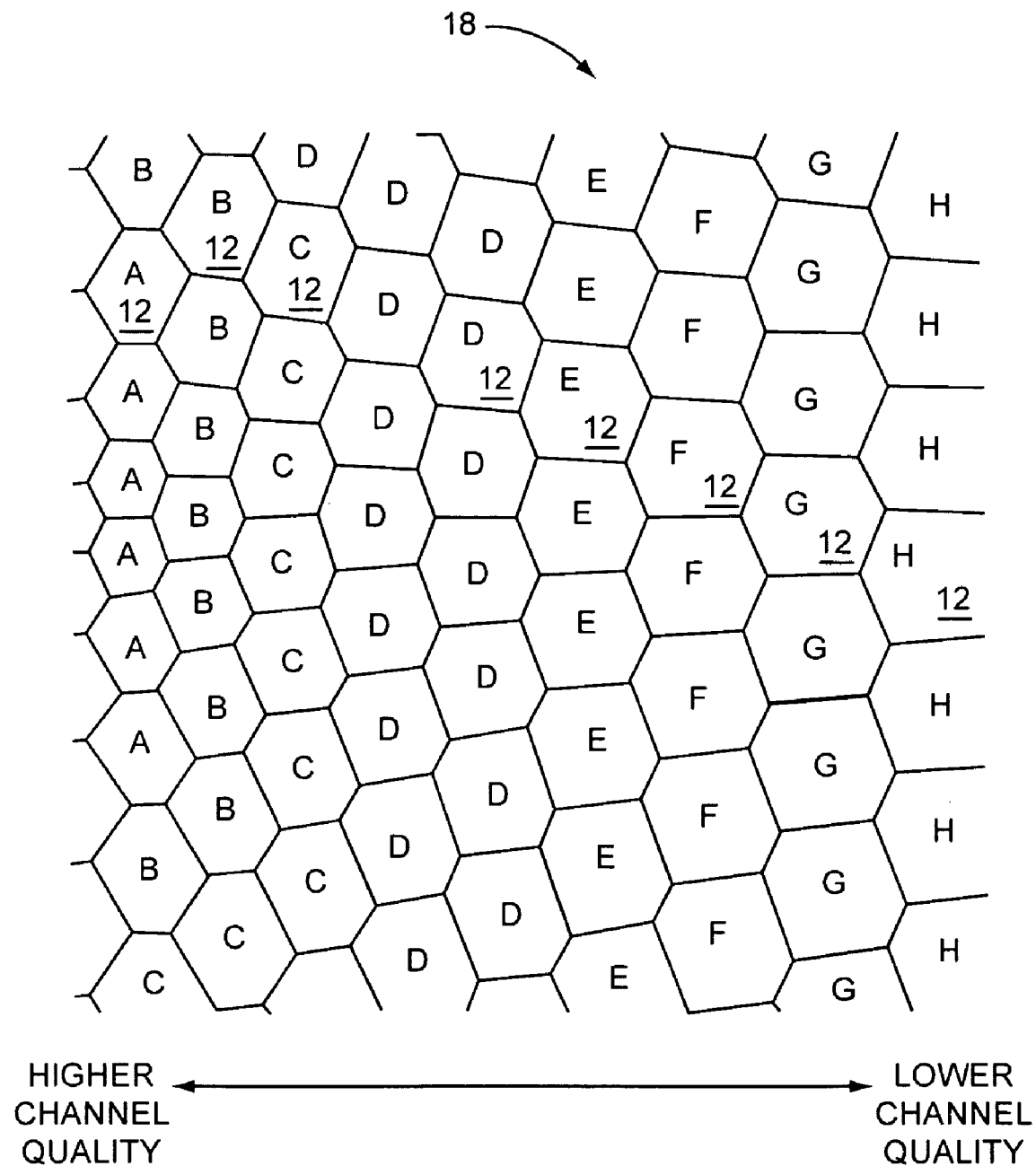
FIG. 2 illustrates a cellular network according to one embodiment of the present invention.

With reference to FIG. 2, a portion of a cellular network 18 is illustrated to include numerous cells 12. Each cell 12 in FIG. 2 is labeled with a letter ranging from A to H. In general, there are multiple series of cells 12, wherein the cells 12 in a given series of cells 12 are effectively the same size and have the same label. The cells 12 on the left side of FIG. 2 are relatively small, and thus have a relatively high channel quality. In contrast, the cells 12 on the right are generally larger and have a relatively lower channel quality. The cells 12 generally increase in size as they progress from the left to the right side of FIG. 2. Accordingly, the channel quality for the cells 12 tends to decrease as the cells 12 progress from the left side to the right side of FIG. 2. For example, cells A have the highest channel quality, and cells H have the worst channel quality, wherein the channel quality decreases from cells A to cells B, from cells B to cells C, from cells C to cells D, from cells D to cells E, from cells E to cells F, from cells F to cells G, and from cells G to cells H. For the purposes of description, cells 12 with the same label are considered like cells 12, and cells 12 with different labels are considered different cells 12. Certain cells 12 may be adjacent like cells 12 or different cells 12. For example, a cell D may be adjacent to other like cells D as well as different cells E.

In one embodiment of the present invention, the base stations 14 and each of the cells 12 (A through H) may broadcast the same data to user terminals 16 at the same time. When broadcasting the data, the base stations 14 in like cells 12 will transmit the data using the same transmission signals at the same time. However, the transmission signals for different cells 12 may vary from one another, but will be configured to substantially reinforce one another near the boundaries of the adjacent cells 12 (A through H). For example, each of the cells A may broadcast data using a first transmission signal, each of the cells B may broadcast the data using a second transmission signal, each of the cells C may broadcast the data using a third transmission signal, and so on and so forth, wherein each of the cells 12 within a given series of cells A through H uses the same transmission signal. However, the transmission signals used by the different series of cells A through H are different. In this embodiment, the difference between the transmission signals used by different cells 12 that are adjacent to one another is relatively small, wherein the different transmission signals substantially reinforce one another despite being different. While the change in transmission signals between different cells 12 that are adjacent one another is relatively small, the continual and gradual changes in the transmission signals across the cellular network 18 may result in the transmission signals on one side of the cellular network 18 varying significantly from transmission signals used on another side of the cellular network 18. For example, the difference between the transmission signals used by cells A and cells B may be relatively small, whereas the difference between the transmission signals used by cells A and cells H may be significant.

In other environments, the difference between the transmission signals from adjacent cells may be relatively large, yet the transmission signals from the adjacent cells are configured to reinforce one another as desired. In one embodiment, any differences between the transmission signals from transmitters in any two adjacent cells may be proportional to the change in actual or presumed channel quality between the two adjacent cells. For example, the channel quality for a given cell may be measured on an average, based on the measurements from those users who are receiving the broadcast data, or based simply on the size of the cell 12. Channel quality may be measured based on any number of actual or predicted factors from the network, user, or environment perspective. Larger changes in channel quality between adjacent cells 12 will result in larger differences between the respective transmission signals, whereas smaller changes in channel quality between adjacent cells 12 will result in smaller differences between the respective transmission signals. The following description references the exemplary cellular network 18 of FIG. 2, wherein the differences in channel quality between the different cells 12 are relatively small. As a result, the differences between the corresponding transmission signals are relatively small. However, the concepts of the present invention equally apply to environments where relatively large differences in channel quality between adjacent cells result in relatively large changes in the corresponding transmission signals. The goal is to take measures to have the transmission signals of adjacent cells 12 reinforce each other, even when they are different.

Those skilled in the art will recognize that the transmission of data may employ various encoding, modulation, and like techniques. The data to be broadcast may represent audio, video, or other media content, and is deemed not to include supplemental information associated with encoding, such as parity information, checksums, and the like. The transmission signals will represent the actual signals being transmitted by the base stations 14 or like transmitters, and may carry information including the data to be broadcast as well as other information, which may include parity information and the like.

In a first embodiment of the present invention, the change in transmission signals across different cells 12 is a function of the encoding rate used by the base stations 14 in the different cells 12. In general, a higher encoding rate indicates that less parity information is used to facilitate forward error correction for a set amount of data. A lower encoding rate indicates that more parity information is used for forward error correction for the same amount of data. Cells 12 associated with higher channel qualities will support higher encoding rates, while cells 12 with lower channel qualities will require lower encoding rates. As the encoding rates decrease, the amount of information required to transmit a certain amount of data increases, and as such, additional transmission resources are required to transmit the data and the associated parity information resulting from the lower rate encoding. In short, cells 12 with higher channel qualities can take advantage of higher encoding rates and use fewer resources to transmit a defined amount of data. In contrast, cells 12 with lower channel qualities will require lower encoding rates, which require more transmission resources. Transmission resources may vary depending on communication technology, but are generally related to time, frequency, phase, multiple access codes, amplitude, and the like.

Like cells 12 that are adjacent one another will transmit the same signal using the same resources for broadcasting the certain data. Different cells 12 that are adjacent one another will transmit slightly different transmission signals. In particular, the transmission signals will be substantially the same, and preferably, a majority of the transmission signals will be the same while a portion of the transmission signals is different. As such, the transmission signals of different cells 12 that are adjacent one another will have common signal portions and at least one of the transmission signals of the different cells 12 will have a different signal portion. The common signal portions of the transmission signals use the same resources in the same way. The different signal portion or portions either use different resources or use the same resources in a different way. As such, one of the transmission signals may use more or less resources than the other or use the same resources in a different way, while both of the transmission signals maintain common signal portions wherein the same resources are used in the same way.

A particular example of a preferred embodiment is illustrated in FIG. 3. In this example, twelve unique resource blocks (RBs) are available for transmitting information in association with broadcasting certain data. The resource blocks are referenced as RB1 through RB12, and may represent any transmission resource or group of transmission resources. Assume that certain data to be broadcast is referenced as data D, and subgroups of the data D are referenced as $D_X$, wherein X=1 through 4. Through an encoding process that supports forward error correction at a receiver, parity information $P_Y$ is generated according to a desired encoding scheme along with the data D, wherein Y corresponds to the incremental parity information associated with a particular encoding layer. As indicated above, as the effective encoding rate decreases, the amount of parity information $P_Y$ required for forward error correction of data D will increase.

As illustrated in FIG. 3, assume for this example that all of the cells A through H will use resource blocks RB1 through RB5 in the same way at the same time for transmitting the same information. In essence, resource blocks RB1 through RB5 represent the common portion of the transmission signals provided by cells 12 (A through H). As depicted, resource block RB1 carries data $D_1$, resource block RB2 carries data $D_2$, resource block RB3 carries data $D_3$, resource block RB4 carries data $D_4$, and resource block RB5 carries the parity information $P_1$ for a first layer of encoding for data D ($D_1$, $D_2$, $D_3$, and $D_4$). Notably, cells A are assumed to have the highest channel quality of the cells A through H, and are the only cells 12 deemed capable of broadcasting data D using only resource blocks RB1 through RB5. Cells B are assumed to have a lower channel quality than cells A, and may require additional parity information to facilitate forward error correction. As such, an additional resource block RB6 is employed by cells B for transmitting the parity information $P_2$. The effective encoding rate for cells A may be 4/5, while the effective encoding rate for cells B may be 2/3. The common signal portion for the transmission signals of cells A and cells B are carried by resource blocks RB1 through RB5, while the different signal portion corresponds to the supplemental parity information $P_2$ that is carried in resource block RB6 in cells B. As one moves across the cellular network 18 of FIG. 2, the different series of cells 12 (A through H) will increasingly use more resources. In particular, cells C will share resource blocks RB1 through RB6 with cells B, and use an additional resource block RB7 for transmitting the additional parity information $P_3$. Similarly, cells D will share resource blocks RB1 through RB7 with cells C, while also using resource block RB8 for transmitting additional parity information $P_4$. This process of cells 12 with lower channel quality using additional resources gradually changes across the cellular network 18. Accordingly, different cells 12 that are adjacent one another employ transmission signals that have common signal portions that are used in the same way, while at least one of the different cells 12 employs a different signal portion that is different than the other cell 12.

With reference to FIG. 4, the data and parity information may be intermingled among the resource blocks in any fashion desirable by the designer. As illustrated, resource blocks RB1 through RB5 have a mixture of data $D_X$ and parity information $P_1$, wherein the parity information $P_1$ is sufficient for forward error correction of data D at a first layer of encoding. While the data and parity information $D_{1-4}$, $P_1$ are shared in resource blocks RB1 through RB5, the parity information associated with a second layer of encoding is provided in resource block RB6, the parity information associated with a third layer of encoding is provided in resource block RB7, and so on and so forth. As readily seen, assuming each of the resource blocks that is utilized is used in the same way at the same time, the difference in the overall transmission signal between adjacent ones of the different cells 12 (A through H) is relatively small, yet the difference in the overall transmission signal between cells 12 (A through H) is significant.

With reference to FIG. 5, the resource blocks that are not used for broadcasting data D may be used for other purposes, such as supporting voice sessions, individual messaging or media sessions, and the like. In essence, the resource allocation for broadcasting data D is the same as that illustrated in FIG. 4. In particular, cells A take advantage of unused resource blocks RB7 through RB12 for other data, cells B take advantage of resource blocks RB8 through RB12 for other data, cells C take advantage of resource blocks RB9 through RB12 for other data, cells D take advantage of resource blocks RB10 through RB12 for other data, cells E take advantage of resource blocks RB11 and RB12 for other data, and cells F take advantage of resource block RB12 for other data. Notably, certain resource blocks may be left unused to effectively provide spectral spacing and minimize interference between adjacent cells 12. As such, the common portions of the transmission signals for different cells 12 that are adjacent one another may reinforce one another while minimizing the interference from other cells 12 that are providing different transmission signals. For example, cells D take advantage of resource block RB8 for parity information P4. Adjacent cells E also use resource block RB8 for transmitting parity information P4. However, cells C and B do not need to use resource block RB8 for transmitting parity information when broadcasting data D. To avoid interfering with the use of resource block RB8 by cells D for transmitting parity information P4 or cells B transmitting other data, cells C will avoid using resource block RB8 in a manner that would potentially interfere with cells B transmitting other data or cells D transmitting parity information P4. Although blanking certain resource blocks RB may be beneficial in certain applications, the use of such blanking techniques is not necessary for practicing the present invention. Further, the blanked resource blocks may be used to transmit unicast data. Preferably, steps are taken to reduce the interfering impact on the data begin broadcast, such as reducing the transmit power associated with transmitting the unicast data relative to transmitting the broadcast data.

With reference now to FIG. 6, yet another example is illustrated for allocating resources in the exemplary cellular network 18. In this instance, cells F are deemed to have the lowest channel quality, while cells E and cells G have similar channel quality, and cells D and cells H have similar channel quality. As such, additional resource blocks RB are used for each successive group of cells A through F. Moving from cells F to cells H through cells G, resource blocks are removed. As such, the resource blocks are allocated based on channel conditions and allow the overall change of the transmission signals from the various cells 12 to track the channel qualities of the respective cells 12. Again, different cells 12 that are adjacent one another will have a significant portion of the transmission signals in common with one another, while larger portions of the transmission signals will vary between the different cells 12 that are not adjacent one another. For like cells 12 that are adjacent one another, the entire transmission signal may be the same.

With the above embodiment, the resource blocks for adjacent ones of like and different cells 12 are used in the same fashion at the same time, such that the common portions of the transmission signals will reinforce one another. The extent to which the transmission signal changes may be a function of the effective encoding rate, wherein when additional information, including parity information, is required for transmission of the data D, additional resources are invoked. In contrast, when less parity information is necessary when moving from one cell 12 to another, fewer resources may be invoked while maintaining a common portion of the transmission signals. With each of these embodiments, most of the benefits of a traditional single frequency network are maintained, while at the same time making more efficient use of network resources.

Figure 7:
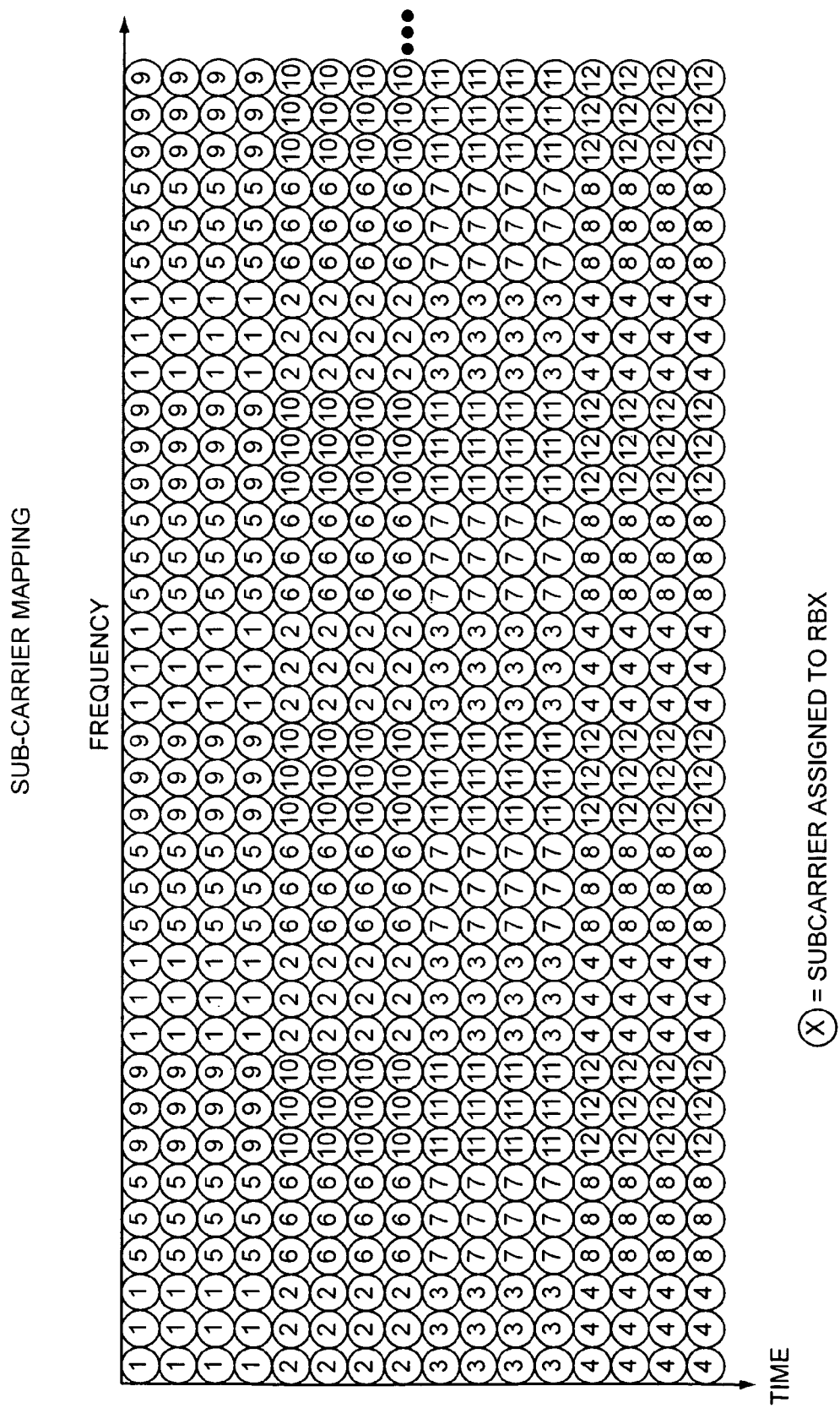
FIG. 7 illustrates sub-carrier mapping to resource blocks according to a first embodiment of the present invention.

The network resources that remain the same or change across different cells 12 will depend on the type of communication technology being employed. The present invention is particularly beneficial in orthogonal frequency division multiple access (OFDM) architectures, where information is modulated on a plurality of relatively low bandwidth sub-carriers during any given time slot. With reference to FIG. 7, a time-frequency mapping of sub-carriers in an OFDM environment is illustrated. In general, each circle represents a sub-carrier, and each row of sub-carriers represents the available sub-carriers for a given time slot. A resource block RB may include a single resource, such as a single sub-carrier during a single time slot, or a group of sub-carriers along one or more time slots. As illustrated, the number located within a sub-carrier identifies a corresponding resource block RB. For example, resource block RB1 includes the first three sub-carriers in the first four time slots, which are grouped at the top left corner of the time-frequency map. In FIG. 7, the sub-carriers allocated for a given resource block are adjacent one another in both time and frequency.

Figure 8:
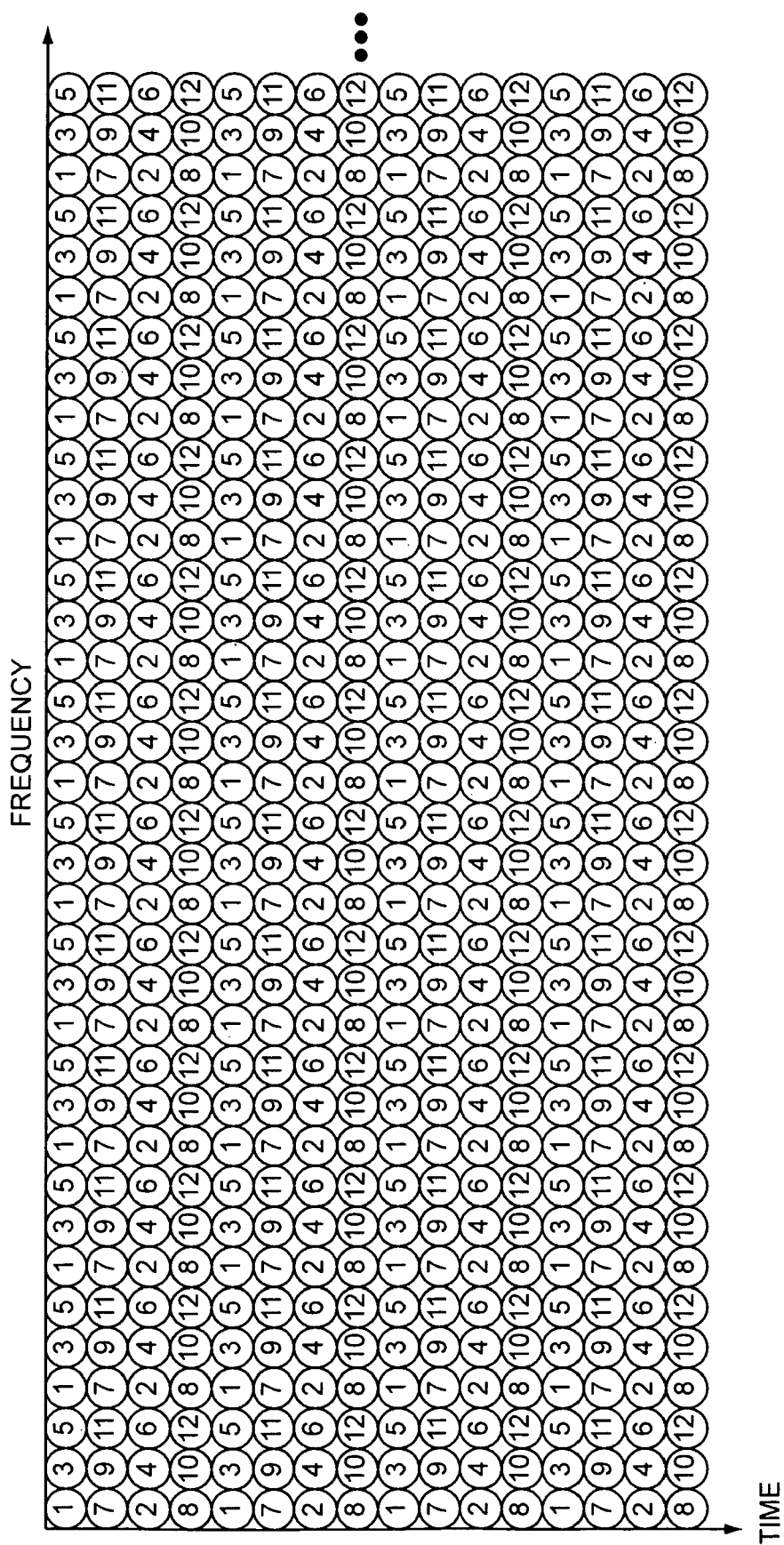
FIG. 8 illustrates sub-carrier mapping to resource blocks according to a second embodiment of the present invention.

However, as illustrated in FIG. 8, the sub-carriers for a given resource block may be intermingled with the sub-carriers of other resource blocks, such that there is a dispersion of sub-carriers throughout the time-frequency spectrum. Notably, the common portions of different transmission signals will use the same sub-carriers in the same way at the same time. In particular, a given symbol may be modulated onto a particular sub-carrier in a resource block across any number of cells 12. As resource blocks are added or subtracted across different cells 12 that are adjacent one another, the common use of the corresponding sub-carriers will change. Accordingly, when significant portions of the transmitted signal are the same, many of the sub-carriers in adjacent cells 12 will be modulated in the same fashion with the same information, such that they will reinforce one another. Again, the goal of the present invention is to gain the benefits of a single frequency network while allowing the actual transmission signals to gradually change across the cellular network 18 in response to changing channel qualities.

With the above embodiment, the transmission signal changes across a cellular network 18 by changing the amount of information being transmitted, and thus the amount of resources necessary for transmitting the information. In another embodiment, the transmission signal changes across a cellular network 18 by gradually transitioning from one modulation layer to another or changing parameters associated with a particular modulation layer. For example, quadrature phase-shift keying (QPSK) modulation may be used on one end of the cellular network 18 and may gradually transition into a higher order modulation, such as 16 quadrature amplitude modulation (QAM) or 64-QAM at the other end of the cellular network 18, as channel qualities permit. In essence, hierarchical modulation is employed in at least certain parts of the cellular network 18, wherein areas that can support higher modulation orders are able to take advantage of the additional resources afforded by such higher orders of modulation. Other areas of the cellular network 18 that can only support lower modulation orders are not afforded the additional resources made available through such higher orders of modulation.

Figure 9A:
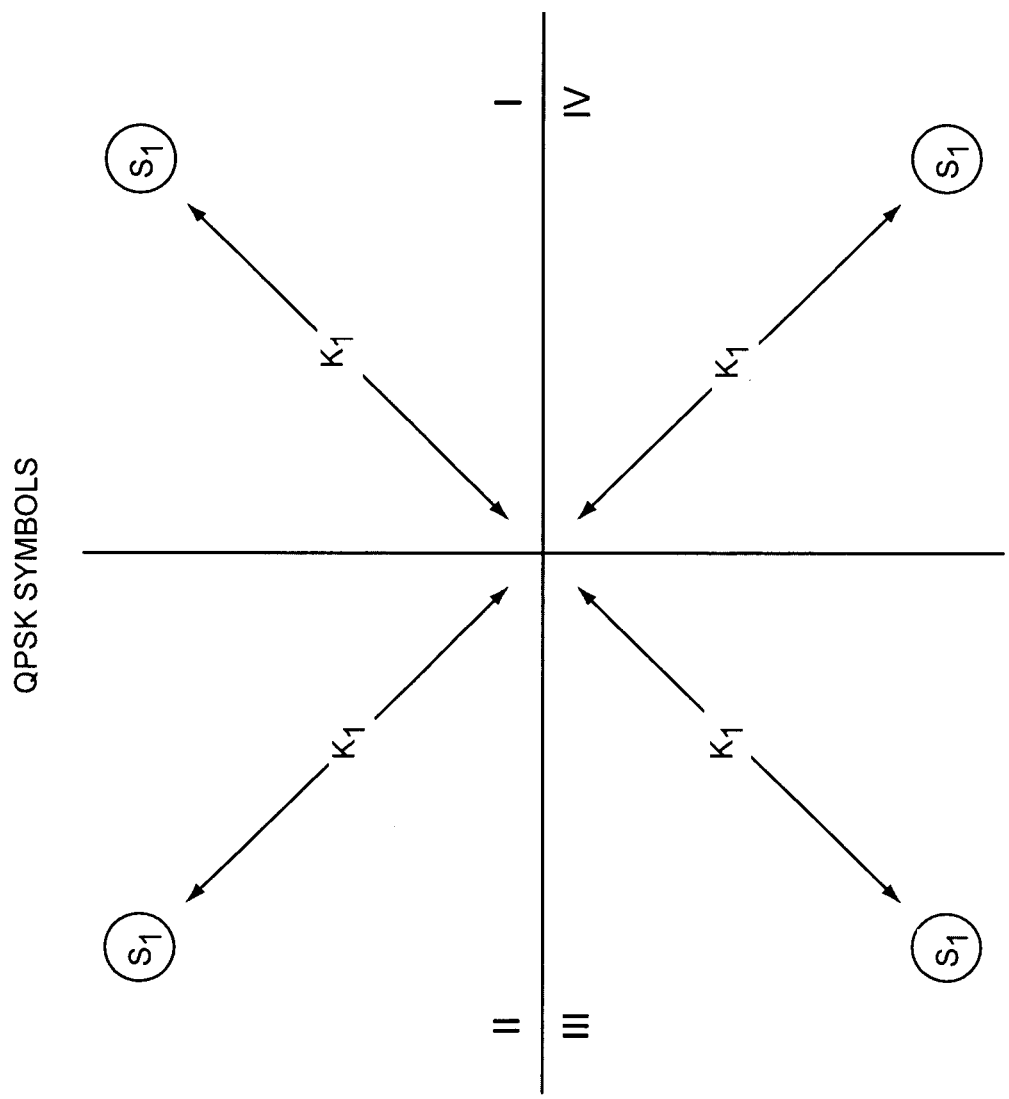
FIGS. 9A-9C illustrate constellations for different layers of hierarchical modulation.
Figure 9B:
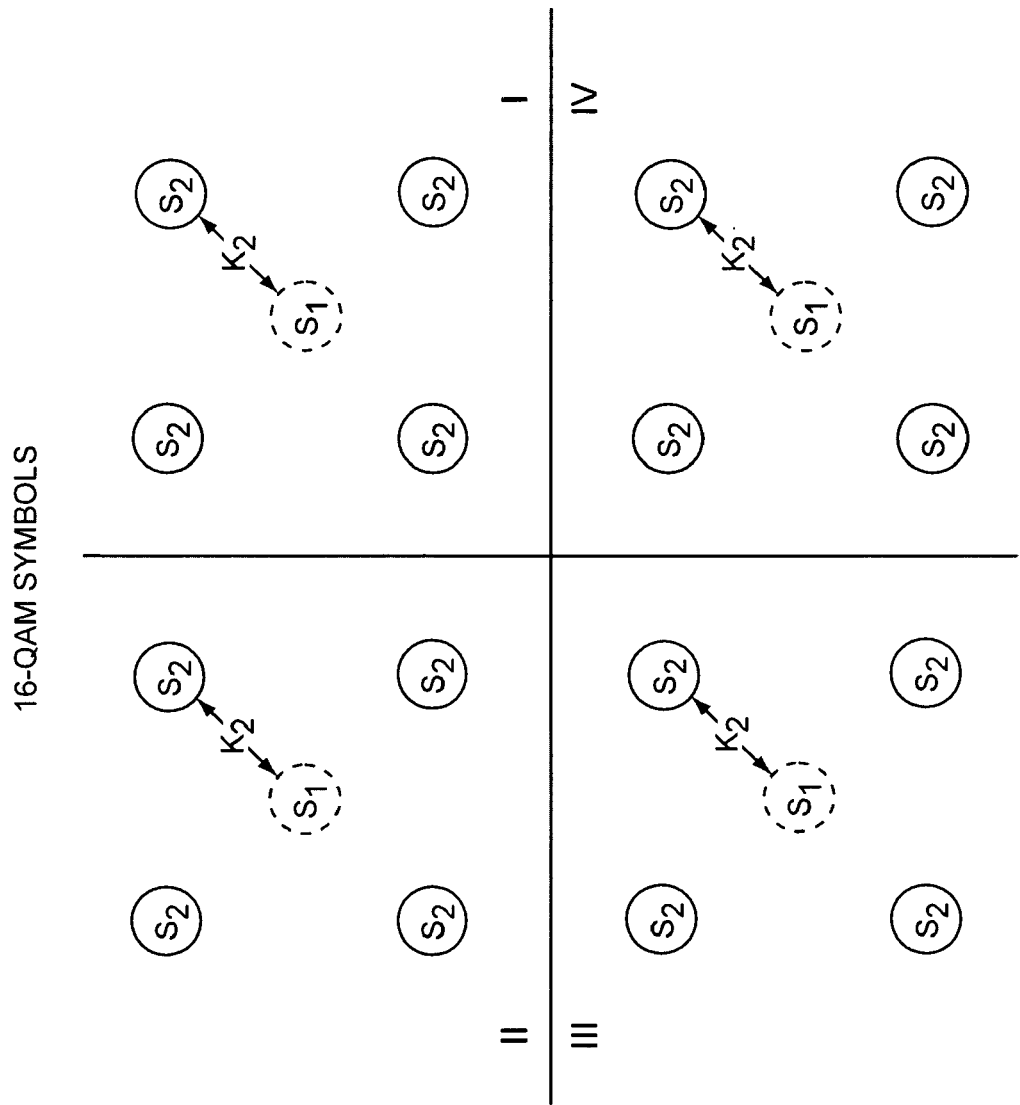

The following provides an overview of hierarchical modulation and how one embodiment of the present invention transitions from one layer of modulation to another. With reference to FIG. 9A, a constellation for QPSK modulation is illustrated. For a given resource at a particular time, one of the available signals $S_1$ is selected for a certain set of data. For QPSK, any given symbol $S_1$ represents a corresponding two bit value ($b_0$, $b_1$). With reference to FIG. 9B, a 16-QAM constellation is illustrated. For 16-QAM modulation, each possible symbol value $S_2$ represents a four bit value ($b_0$, $b_1$, $b_2$, $b_3$). Notably, in each quadrant of the constellation, the 16-QAM symbols $S_2$ are generally spaced about the position of a QPSK symbol $S_1$. The QPSK symbol $S_1$ is a first layer scaling factor $K_1$ from the origin of the constellation (see FIG. 9A). The 16-QAM symbols $S_2$ are a second layer scaling factor $K_2$ from an associated QPSK signal $S_1$. Notably, the QPSK signals are not modulated along with the 16-QAM symbols; however, the relationship is important because the two most significant bits ($b_0$, $b_1$) of the 16-QAM symbols effectively correspond to the two bits of a QPSK symbol $S_1$. When a receiver is able to resolve the 16-QAM symbols $S_2$, each of the four bits ($b_0$, $b_1$, $b_2$, $b_3$) may be recovered. However, if the receiver is only able to determine which quadrant a symbol resides in, the receiver is effectively only receiving QPSK symbols, and thus will only be able to recover bits $b_0$ and $b_1$. Since the full 16-QAM symbol cannot be resolved, the least significant bits $b_2$, $b_3$ are lost. Network designers can take advantage of these characteristics by mapping higher priority data to the most significant bits $b_0$, $b_1$ and lower priority data to the least significant bits $b_2$, $b_3$. When the 16-QAM symbols can be fully resolved, each of the bits $b_0$, $b_1$, $b_2$, $b_3$ can be recovered, and when only the quadrant in which a symbol resides can be recovered, only the most significant bits $b_0$, $b_1$ of the lower layer are recovered. This process can be extended to higher modulation orders, as illustrated in FIG. 9C.

Figure 9C:
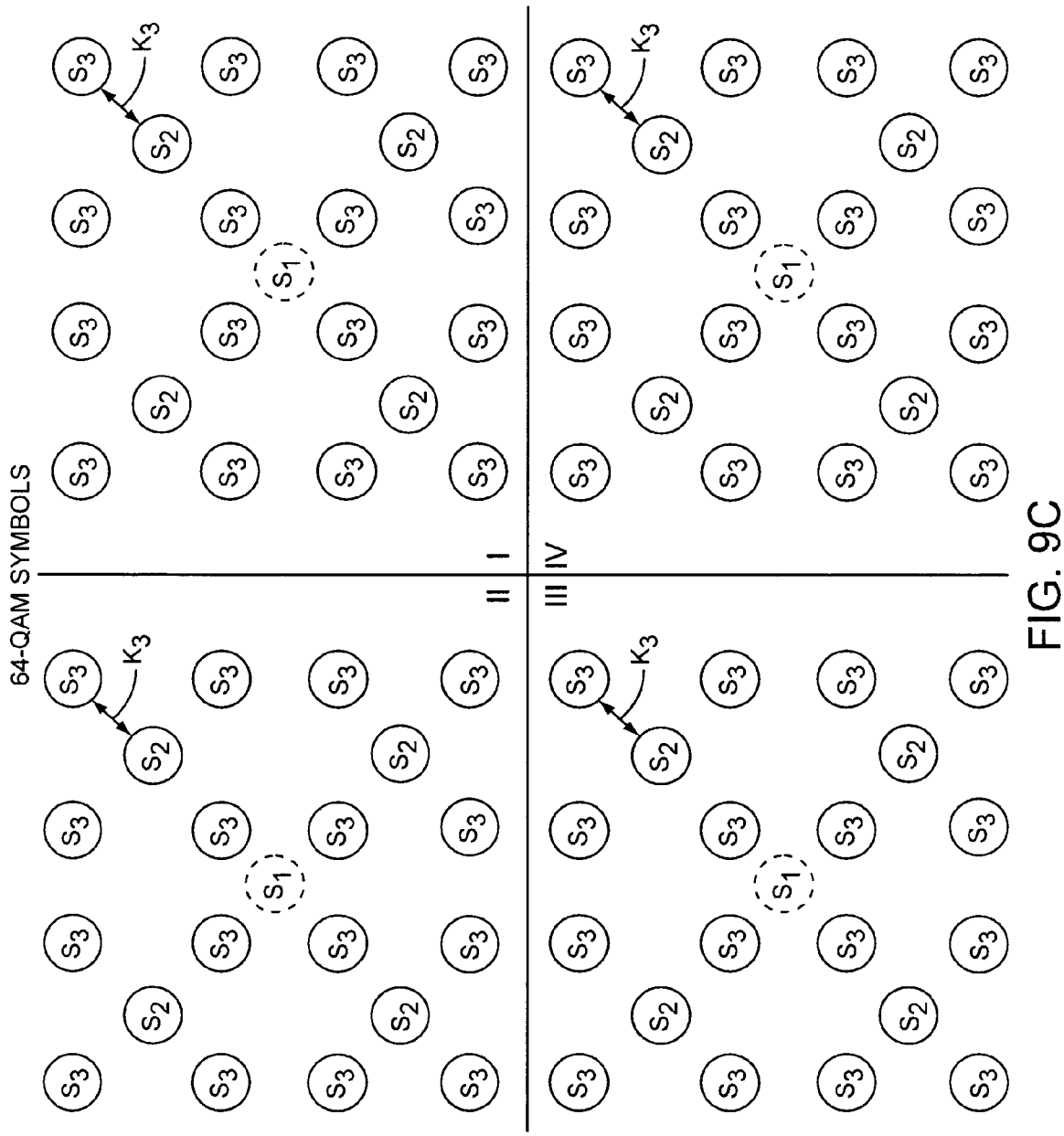

As illustrated in FIG. 9C, a 64-QAM constellation has 64 symbols $S_3$ associated with a scaling factor $K_3$, which is effectively a measure of the distance between associated 64-QAM symbols $S_3$ with the relative position of 16-QAM symbols $S_2$. For 64-QAM modulation, each symbol corresponds to 6 bits ($b_0$, $b_1$, $b_2$, $b_3$, $b_4$, $b_5$). Continuing with the hierarchical modulation described above, bits $b_4$ and $b_5$ may be associated with an even lower priority layer or channel, and only when the 64-QAM symbols may be fully resolved will bits $B_4$ and $B_5$ be able to be recovered. If the receiver can only effectively resolve 16-QAM symbols $S_2$, only bits $b_0$, $b_1$, $b_2$, and $b_3$ can be recovered. If the receiver can only effectively resolve QPSK symbols $S_1$, then only bits $b_0$ and $b_1$ can be recovered. This process may be extended for any number of modulation layers. With regard to any modulation layer, the scaling factor $K_X$ corresponds to the modulation layer and is a distance to a reference origin of symbols associated with a lower modulation layer.

Figure 10A:
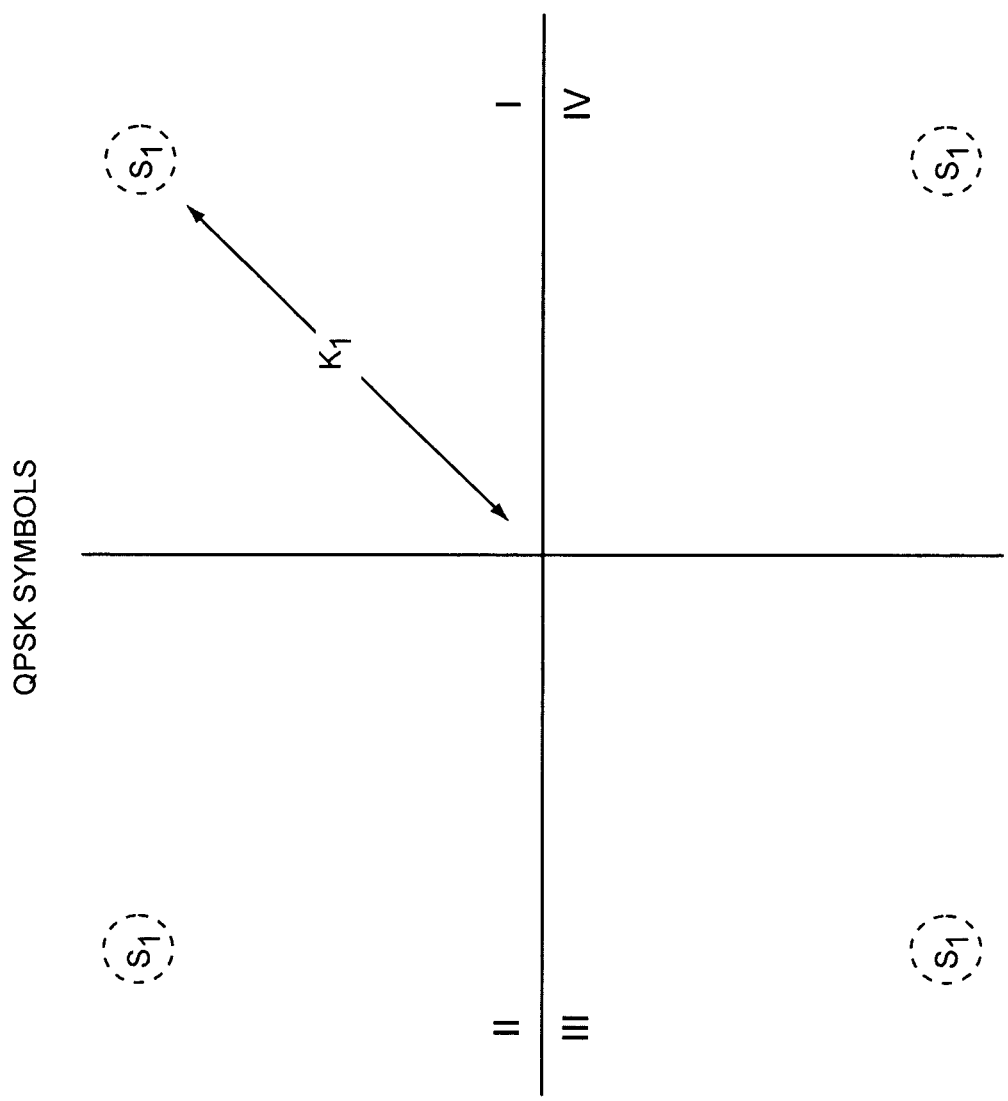
FIGS. 10A-10F illustrate the transition from a first layer QPSK modulation to a third layer 64-QAM modulation according to one embodiment of the present invention.
Figure 10B:
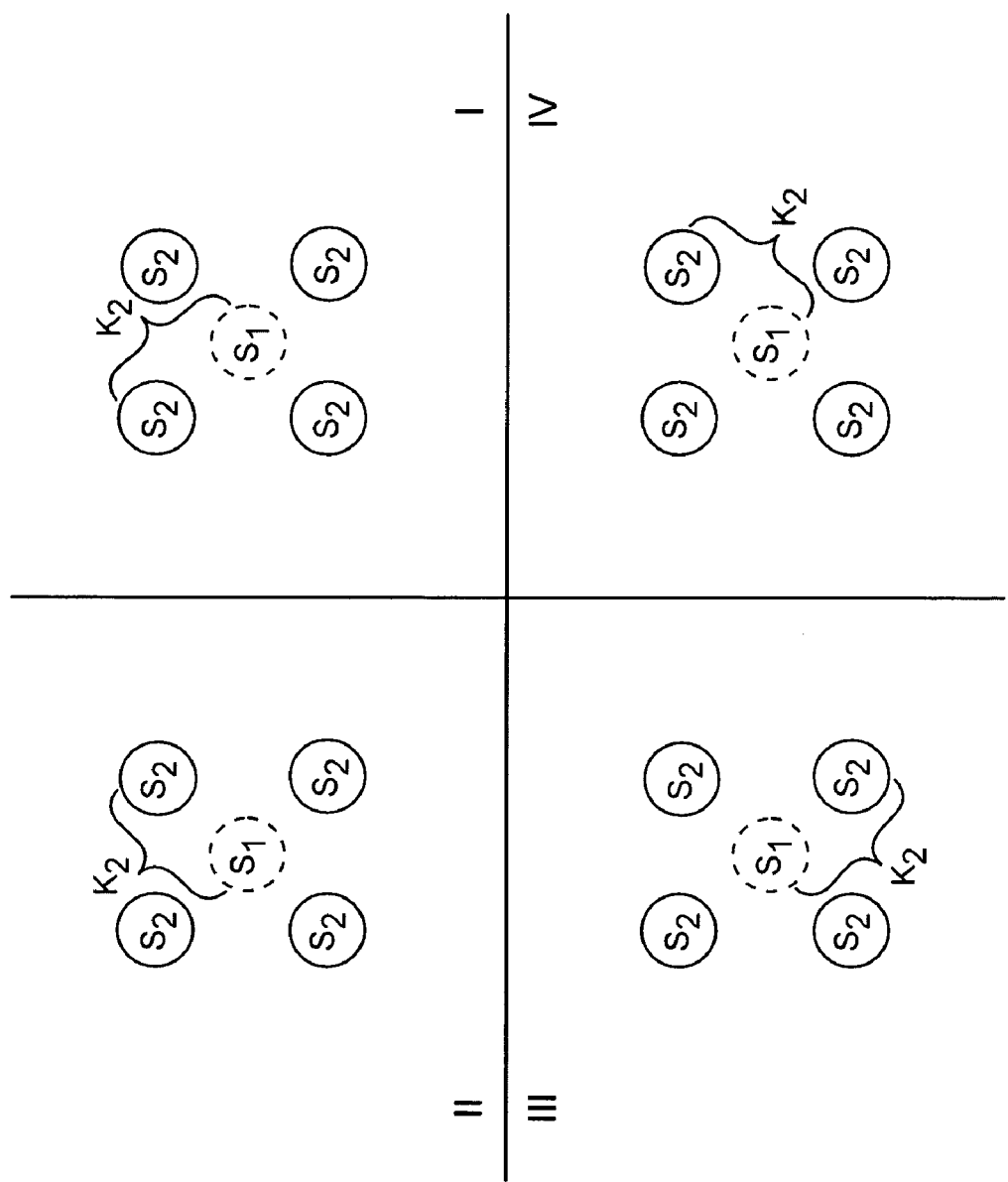
Figure 10C:
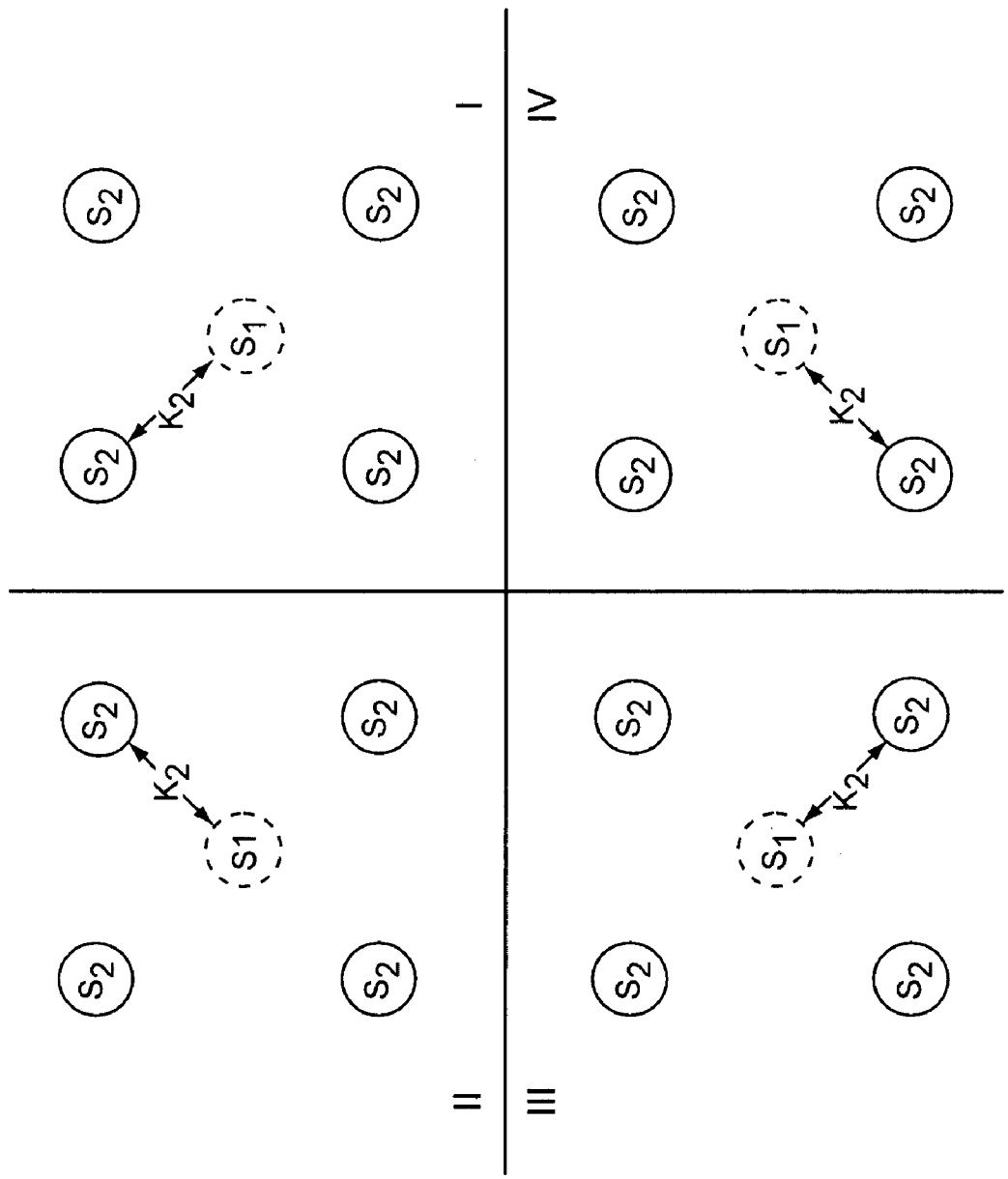

With respect to one embodiment of the present invention, the transmission signals used for broadcasting data may gradually transition from one modulation order to another across the cellular network 18. This gradual changing of the modulation order may systematically transition from a first modulation layer to a second modulation layer by gradually increasing or decreasing the scaling factors $K_X$. With reference to FIG. 10A, assume QPSK modulation is used in cells H for broadcasting data. Accordingly, the selected QPSK symbol is represented by $K_1 S_1$. At an adjacent cell 12, such as one of cells G, assume that the transition from QPSK modulation to 16-QAM modulation is initiated as shown in FIG. 10B. However, the scaling value for the 16-QAM symbols may be relatively small, such that the second order 16-QAM symbols $S_2$ are very close to where the first order QPSK symbols $S_1$ would have been located. As such, the QPSK symbols in cells H and the corresponding 16-QAM symbols in cells G will effectively reinforce one another. Moving across the cellular network 18, cells F may continue to use the second order 16-QAM modulation as shown in FIG. 10C; however, the second layer scaling factor $K_2$ is increased such that the 16-QAM symbols in any given quadrant will move away from each other and the location where the corresponding QPSK symbol $S_1$ would have been located. The second layer 16-QAM symbols $S_2$ will be easier to resolve as the second layer scaling factor $K_2$ increases. Further, corresponding 16-QAM symbols in cells F and G will continue to substantially reinforce one another.

Figure 10D:
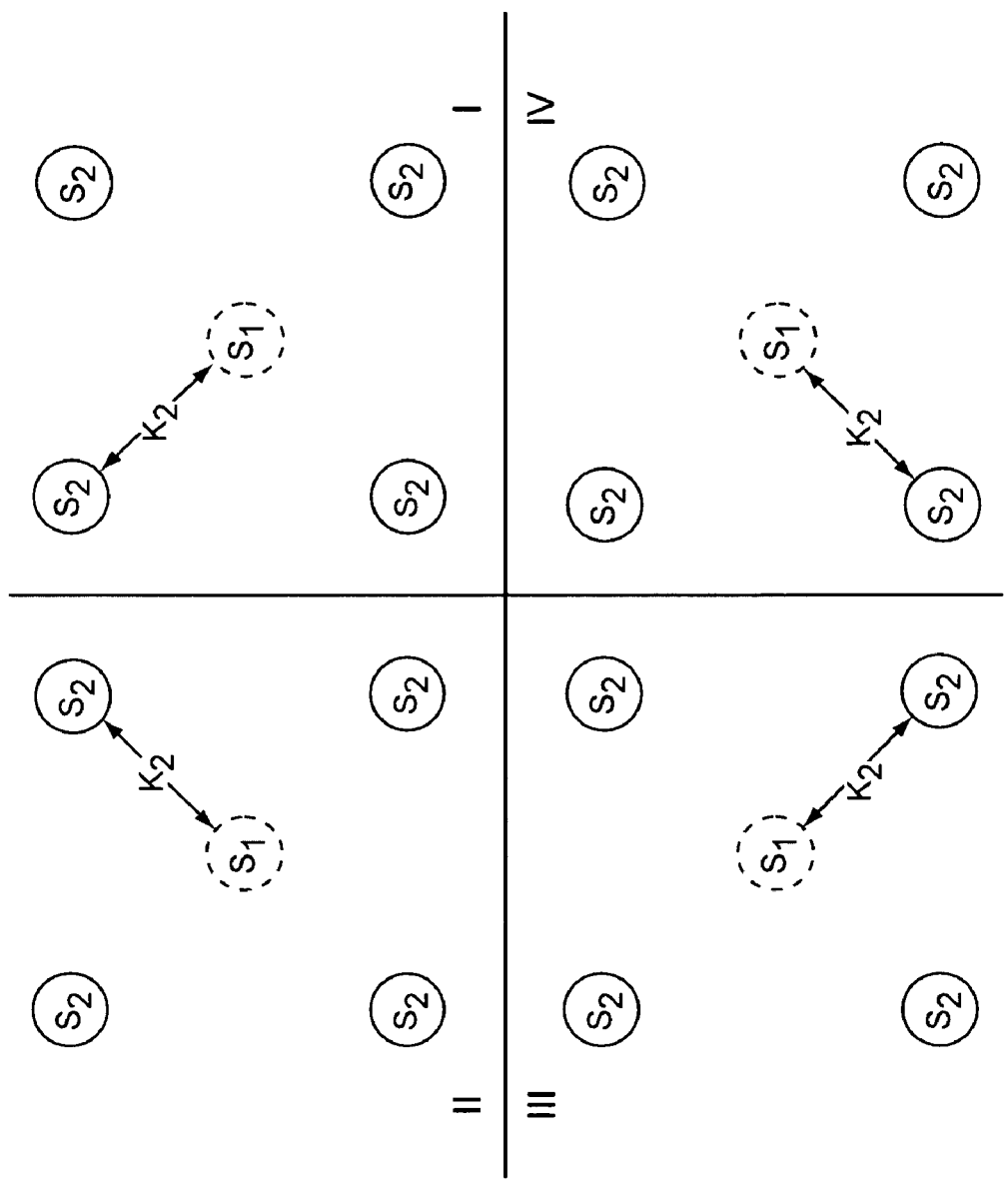
Figure 10E:
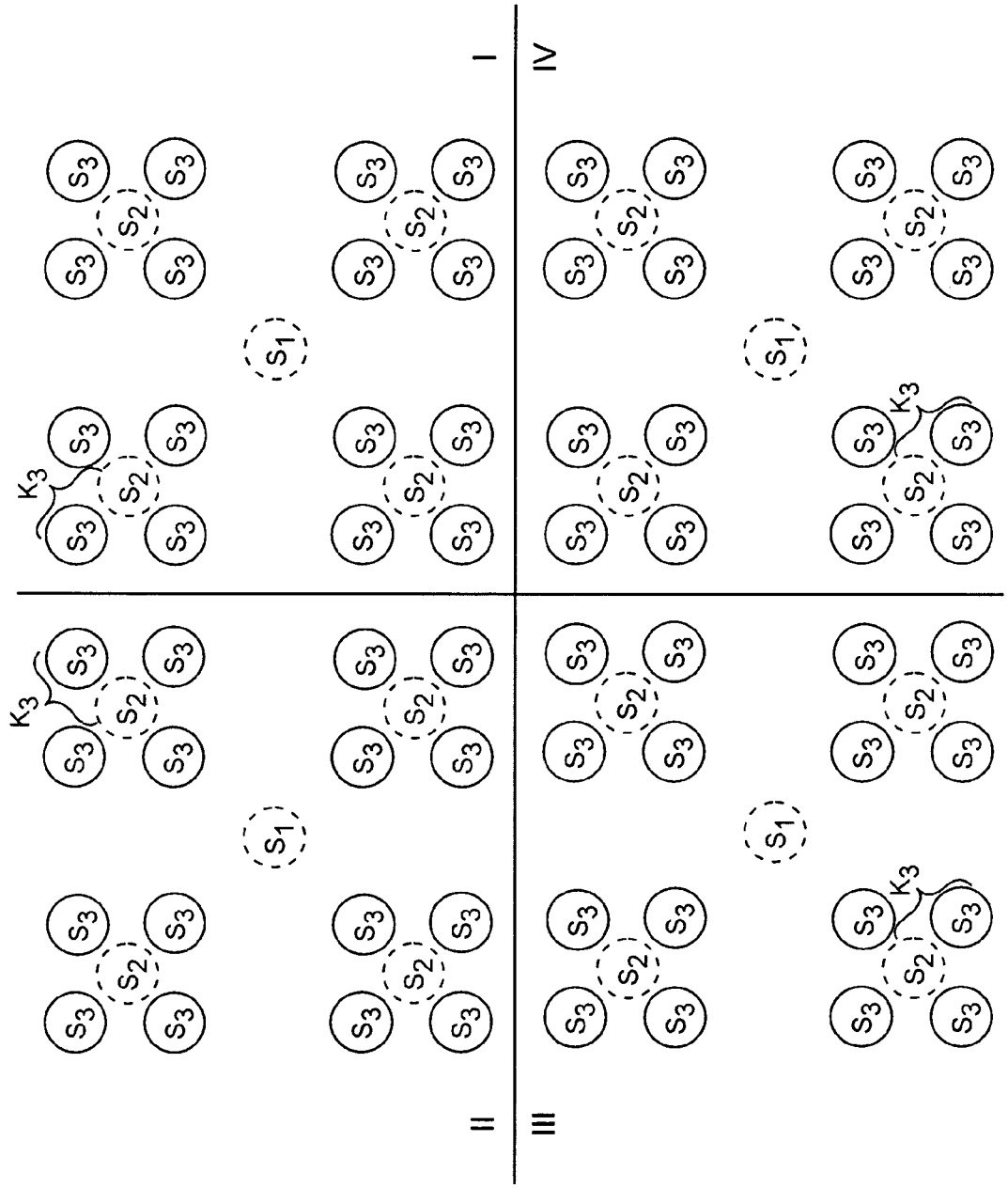
Figure 10F:
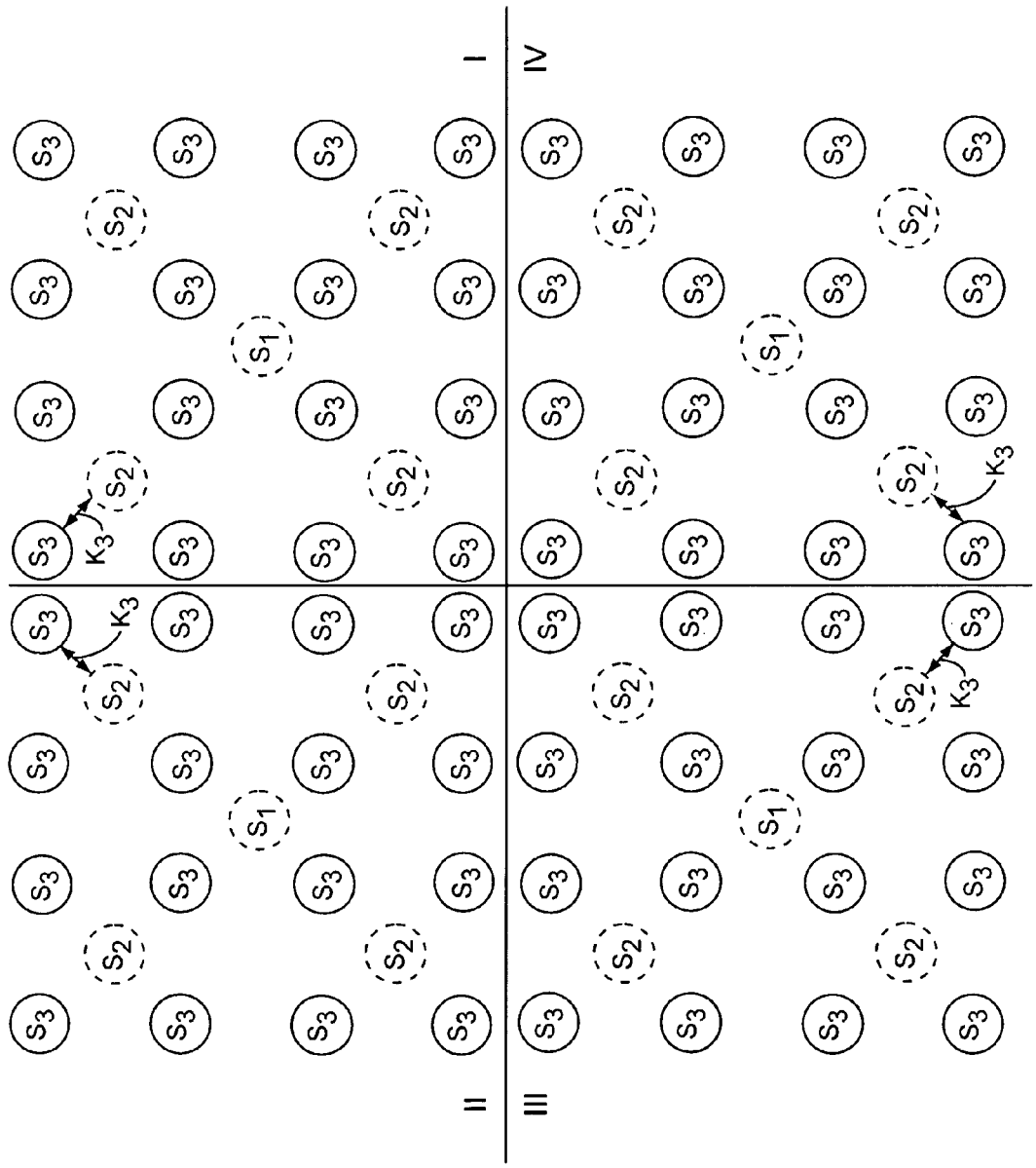

With reference to FIG. 10D, the 16-QAM constellation used in cells E is illustrated. Notably, the second order 16-QAM modulation is used; however, the second layer scaling factor $K_2$ is increased over the second layer scaling factor $K_2$ that used in cells F. The constellation for cells D is illustrated in FIG. 10E. Like the transition from cells H to cells G, the transition from cells E to cells D involves implementation of a higher modulation layer. Since the change in transmission signal between different cells 12 that are adjacent one another should be relatively small, the third layer scaling factor $K_3$ is relatively small when the third layer 64-QAM modulation is first introduced in the cellular network 18. As such, the third layer 64-QAM symbols $S_3$ transmitted in cells D will tend to reinforce the second order 16-QAM symbols $S_2$ transmitted in cells E. With reference to FIG. 10F, the constellation for cells C is illustrated. The 64-QAM modulation remains in effect; however, the third layer scaling factor $K_3$ is increased relative to the third layer scaling factor $K_3$ used in cells D. As such, the 64-QAM modulation symbols will be easier to resolve, yet continue to reinforce corresponding symbols in cells D.

This gradual progression from one modulation order to another and varying the corresponding scaling values to effect a gradual transition from one modulation order to another across the cellular network 18 will continue as desired based on various criteria, such as channel quality. When such hierarchical modulation is employed across the cellular network 18, the common portion of the transmission signal that continues across different cells 12 that are adjacent one another is the lowest or one of the lower level modulation layers. As such, broadcast data may be transmitted on a lower modulation layer across a portion of or the entire cellular network 18, while higher modulation layers may be used to carry other data for unicast, multi-cast, or limited broadcast purposes. The portion of the transmission signal that changes will relate to the higher modulation orders. Notably, for over-the-air combining or reinforcement to occur, adjacent cells 12 should transmit symbols that roughly correspond to each other in their respective modulation layers, whether the modulation layers are the same or different.

Notably, the above example provides a relatively aggressive transition from first layer QPSK modulation in cells H to 64-QAM modulation in cells C. In practice, such transitions among different cells 12 that are adjacent one another are preferably more gradual. FIG. 11 provides a table illustrating the first and second layer scaling factors $K_1$, $K_2$ for transitioning from a first layer QPSK modulation in cells H wherein the first layer scaling factor is 2, to a second layer 16-QAM modulation having a first layer scaling factor $K_1$ of 1.85 and a second layer scaling factor $K_2$ of 0.8. Preferably, the scaling factors $K_X$ are selected based on channel conditions, and are preferably made available to the user terminals 16 to assist with demodulation and recovery of the transmitted information.

The description of the previous embodiment references the exemplary cellular network 18 of FIG. 2, wherein the differences in channel quality between the different cells 12 are relatively small. As a result, the differences between the corresponding transmission signals are relatively small. However, the concepts of the present invention equally apply to environments where relatively large differences in channel quality between adjacent cells 12 result in relatively large changes in the corresponding transmission signals. The goal is to take measures to have the transmission signals of adjacent cells 12 reinforce each other, even when they are different. When channel quality is used to control the changes in transmission signals, larger changes in channel quality between adjacent cells 12 will result in larger differences between the respective transmission signals, whereas smaller changes in channel quality between adjacent cells 12 will result in smaller different between the respective transmission signals.

In yet a third embodiment of the present invention, the concepts of the first and second embodiments may be combined. For example, the use of different encoding rates and associated resources of the first embodiment may be combined with the hierarchical modulation of the second embodiment. The technique is best illustrated through example. To emphasize the potential gradualness of the transition in the transmitted signal across the cellular network 18, assume that there are a series of cells A through M, wherein cells A have the highest channel quality, and cells M have the lowest channel quality. With reference to FIG. 12, assume that cells M employ layer 1 QPSK modulation wherein the first layer scaling factor $K_1$ is 2. Further assume that cells M employ an encoding rate of 1/3, which requires the use of 12 resource blocks. Cells L have a slightly better channel quality than cells M, and as such cells L continue to employ layer 1 QPSK modulation having a first layer scaling factor $K_1$ of 2; however, the encoding rate increases to 4/11 and the required number of resource blocks decreases to 11 relative to that of cells M. For the transitions through cells J, I, and H, the number of allocated resource blocks will continue to drop and the encoding rate will continue to increase while modulation stays at the first layer QPSK modulation. Accordingly, cells G may have a relatively high encoding rate of 4/5 and only employ 8 resource blocks, while continuing to use layer 1 QPSK modulation having a first layer scaling factor $K_1$ of 2.

When transitioning from cells G to cells F, the modulation order changes to 16-QAM. Given the transition to the second layer 16-QAM modulation, the encoding rate may decrease. Although only 8 resource blocks are used, the use of the second layer 16-QAM modulation provides a higher effective transmission rate, which may be used to support the decreased encoding rate. Notably, to ensure the transmitted symbols in cells G and cells E reinforce those of cells F, the first layer scaling factor $K_1$ is 2 and the second layer scaling factor $K_2$ is only 0.2. Cells E will increase the encoding rate and decrease the number of resource blocks used for the transmission signal; however, the second layer scaling factor $K_2$ will increase to 0.5. As such, the corresponding symbols transmitted in cells E and cells F for the transmission signal will continue to reinforce one another. As one progresses across the cellular network 18 to cells A, the number of allocated resource blocks will continue to drop, the encoding rate will continue to increase, and the second layer scaling factor $K_2$ will continue to increase while the modulation remains at 16-QAM. Accordingly, a GSFN architecture is provided to support broadcasting data across all or a portion of the cellular network 18, wherein the transmission signal provided by different cells 12 across the cellular network 18 may differ from one another to address existing channel conditions while substantially reinforcing one another in a similar fashion to that of a traditional single frequency network.

The channel conditions may be measured manually, by the user terminals 16, or by the base stations 14. The transmission plan for the GSFN may be calculated based on these channel conditions by the base stations 14 in an individual or cooperative manner, or by a central authority that may instruct each of the base stations 14 to employ the appropriate transmission parameters to ensure the base stations 14 are transmitting the appropriate transmission signals relative to one another. Since the transmission signals for the GSFN vary across the cellular network 18 and may include different information, use different resources, and employ different modulation layers, corresponding control information may need to be transmitted to the user terminals 16. The control information may be specific to a particular cell 12 or group of cells 12, and may be provided to the user terminals 16 in any number of ways. The control information may be embedded in all or certain resource blocks, and the control information may identify the data stream to which it belongs and an order in which to process the information in a particular resource block. Similarly, control information may be embedded in the different modulation layers, wherein the control information in a given modulation layer would correspond to that particular modulation layer or higher modulation layers.

In another embodiment, the user terminal 16 may use information determined from a separate source to determine an appropriate control region to use. The GSFN may provide multiple control regions from which the user terminal 16 may select. For example, different control regions may be transmitted with control information. On a reserved time-frequency resource, each base station 14 that belongs to a particular control region will transmit a corresponding sequence. The user terminal 16 will select one of the appropriate sequences transmitted from the different base stations 14 based on the sequence received with the strongest signal strength. The control information in the control region associated with the highest signal strength is the control information used by the user terminal 16.

In yet another embodiment, the user terminal 16 may blindly detect resource blocks that go together by trying different combinations, wherein the number of combinations to try may be limited in a defined manner. The user terminal 16 does not need to re-try all different combinations after an appropriate combination is determined, and may continue to use the same combination for some predetermined period of time. This method may be combined with other signaling methods to reduce the overhead associated with the other signaling schemes. The control information for the broadcasting provided by the GSFN may be transmitted to each user terminal 16 using unicast techniques, wherein the control information is individually sent to each of the available user terminals 16. This is in contrast to the above examples wherein the control information is effectively broadcast along with the data being broadcast. In another embodiment, the control information may be broadcast using the same resources by the different base stations 14. The user terminal 16 will attempt to decode the overlapping and potentially interfering signals, and select the strongest signal as the one providing the appropriate control information. Generally, the control information associated with the strongest signal will be the appropriate control information.

With particular reference to FIG. 13, a base station 14 configured according to one embodiment of the present invention is illustrated. Notably, the base station 14 may support any type of wireless communication technology, such as traditional cellular technologies employing OFDM, code division multiple access (CDMA), and time division multiple access (TDMA) and local wireless technologies such as those set forth in the IEEE 802.11 standards. Accordingly, the base station 14 may act as any wireless access point that supports wireless communications. The base stations 14 will preferably be able to support traditional individual or unicast sessions with individual user terminals 16 that are within communication range while cooperating to broadcast the same data across the entire cellular network 18 as described above.

The base station 14 generally includes a control system 20, a baseband processor 22, transmit circuitry 24, receive circuitry 26, one more antennas 28, and a network interface 30. The receive circuitry 26 receives radio frequency signals bearing information from one or more remote transmitters provided by user terminals 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent toward the core network via the network interface 30 or transmitted toward another user terminal 16 serviced by the base station 14. The network interface 30 will typically interact with the core network via the base station controller 10.

On the transmit side, the baseband processor 22 receives digitized data, which may represent voice, data, or control information, from the network interface 30 under the control of control system 20, which encodes the data for transmission. The encoded data is output to the transmit circuitry 24, where it is used by a modulator to modulate a carrier signal that is at a desired transmit frequency or frequencies. A power amplifier (not shown) will amplify the modulated carrier signal to a level appropriate for transmission, and deliver the modulated carrier signal to one or more of the antennas 28 through a matching network.

With reference to FIG. 14, a fixed or mobile user terminal 16 configured according to one embodiment of the present invention is illustrated. The user terminal 16 will support a communication technology that is compatible with the base stations 14. The user terminal 16 will include a control system 32, a baseband processor 34, transmit circuitry 36, receive circuitry 38, one or more antennas 40, and user interface circuitry 42. The receive circuitry 38 receives radio frequency signals bearing information from one or more remote transmitters provided by base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams. The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the one or more antennas 40 through a matching network. Various modulation and processing techniques available to those skilled in the art are applicable to the present invention.

Those skilled in the art will recognize improvements and modifications to the preferred embodiments of the present invention. All such improvements and modifications are considered within the scope of the concepts disclosed herein and the claims that follow.

What is claimed is:

1. A method for providing a graduated single frequency network comprising:
   providing a plurality of transmitters throughout a desired geographic area to form a plurality of cells of the network; and
   broadcasting data of the network from each of the plurality of transmitters such that adjacent cells of the plurality of cells of the network transmit the data in corresponding transmission signals that reinforce one another wherein:
   for different cells among the plurality of cells of the network that are adjacent one another, the transmission signals are different from one another yet configured to reinforce one another through over-the-air combining of the different transmission signals broadcast from the different cells at a same time along boundaries of the different cells among the plurality of cells of the network, and
   for like cells among the plurality of cells of the network that are adjacent one another, the transmission signals are essentially the same and reinforce one another through over-the-air combining along boundaries of the like cells among the plurality of cells of the network.

2. The method of claim 1 wherein the transmission signals used for broadcasting the data from a first transmitter in the desired geographic area are different from the transmission signals used for broadcasting the data from a second transmitter in the desired geographic area, the first transmitter and second transmitter being non-adjacent; and wherein any differences between the transmission signals among any two adjacent cells of the plurality of cells are smaller than the differences between the transmission signals among the first transmitter and the second transmitter.

3. The method of claim 1 wherein a portion of each of the transmission signals for different cells that are adjacent one another is the same.

4. The method of claim 1 wherein the transmission signals for each of the plurality of cells are configured based at least in part on corresponding channel quality for each of the plurality of cells.

5. The method of claim 4 further comprising:
   determining channel qualities for the plurality of cells; and
   determining transmission parameters for the transmission signals based on the channel qualities such that for the different cells, the transmission signals are different from one another yet configured to substantially reinforce one another through over-the-air combining along the boundaries of the different cells, and for the like cells, the transmission signals are essentially the same.

6. The method of claim 4 wherein the channel qualities vary among certain of the plurality of cells throughout the desired geographic area and transmission signals throughout the plurality of cells gradually change in relation to changes in the channel qualities.

7. The method of claim 1 wherein for the different cells that are adjacent to one another, the transmission signal for a first of the different cells uses additional resources than those used for the transmission signal for a second of the different cells.

8. The method of claim 7 wherein the transmission signals for the first of the different cells and the second of the different cells include a common signal portion that uses first resources in the same way at the same time, such that the first of the different cells uses the first resources and the additional resources to broadcast the data and the second of the different cells uses only the first resources to broadcast the data.

9. The method of claim 7 wherein the data to be broadcast is encoded at a lower rate by the first of the different cells and encoded at a higher rate by the second of the different cells and the additional resources used by the transmission signal for the first of the different cells carries additional information associated with encoding the data at the lower rate.

10. The method of claim 7 wherein resources used by the transmission signals and the corresponding encoding rates used to encode the data being broadcast varies across the plurality of cells based on channel qualities associated with the plurality of cells.

11. The method of claim 7 wherein resources used by the transmission signals and the corresponding encoding rates used to encode the data being broadcast varies across the plurality of cells.

12. The method of claim 7 wherein certain resources for the transmission signals that are used to broadcast the data in a first cell of the plurality of cells are used to transmit information unrelated to the data in a second cell of the plurality of cells.

13. The method of claim 12 wherein at least one cell of the plurality of cells resides between the first cell and the second cell, and the at least one cell avoids using the certain resources for transmitting information intended to be received by a user terminal.

14. The method of claim 12 wherein at least three of the plurality of cells use transmission signals that are different from one another such that at least three different transmission signals are being used to broadcast the data in the desired geographic area at any given time.

15. The method of claim 1 wherein the data is broadcast using a first modulation layer of a hierarchical modulation scheme having a plurality of modulation layers, and for the different cells that are adjacent one another, the transmission signal for a first of the different cells employs at least one different hierarchical modulation parameter compared to that used for the transmission signal for a second of the different cells.

16. The method of claim 15 wherein the at least one different hierarchical modulation parameter comprises a constellation scaling factor.

17. The method of claim 15 wherein the at least one different hierarchical modulation parameter comprises a modulation order that includes the first modulation layer and at which the transmission signal is modulated.

18. The method of claim 15 wherein for at least certain of the different cells that are adjacent one another, the transmission signal for a first of the different cells is modulated at a first modulation order that corresponds to the first modulation layer and the second of the different cells is modulated at a second modulation order that includes the first modulation order.

19. The method of claim 18 wherein a constellation scaling factor for the second modulation order is sufficiently small such that the transmission signal of the first of the different cells and the transmission signal of the second of the different cells reinforce one another.

20. The method of claim 15 wherein for at least certain of the different cells that are adjacent one another, the transmission signal for a first of the different cells and the transmission signal for a second of the different cells are modulated at a common modulation order, and a constellation scaling factor of the transmission signal for the first of the different cells is different than a corresponding constellation factor of the transmission signal for the second of the different cells.

21. The method of claim 20 wherein a difference between the constellation scaling factor of the transmission signal for the first of the different cells and the corresponding constellation factor of the transmission signal for the second of the different cells is small enough to ensure the transmission signal of the first of the different cells and the transmission signal of the second of the different cells substantially reinforce one another.

22. The method of claim 20 wherein the common modulation order comprises the first modulation layer and a second modulation layer that is one layer higher than the first modulation layer, and the constellation scaling factor is a scaling factor for a constellation of the second modulation layer.

23. The method of claim 15 wherein the hierarchical modulation scheme comprises a second modulation layer that is used for transmitting information other than the data being broadcast in the first modulation layer for at least some of the plurality of cells.

24. The method of claim 15 wherein the at least one different hierarchical modulation parameter is based on channel qualities associated with each of the plurality of cells.

25. The method of claim 1 wherein for the different cells that are adjacent one another, the transmission signal for a first of the different cells uses additional resources than those used for the transmission signal for a second of the different cells, and wherein the data is broadcast using a first modulation layer of a hierarchical modulation scheme having a plurality of modulation layers and for the different cells that are adjacent one another, the transmission signal for a first of the different cells employs at least one different hierarchical modulation parameter compared to that used for the transmission signal for a second of the different cells.

* * * * *